US012412523B2

(12) United States Patent
Ok et al.

(10) Patent No.: US 12,412,523 B2
(45) Date of Patent: Sep. 9, 2025

(54) METHOD OF COMPENSATING FOR DEGENERATION OF ELECTROLUMINESCENT DISPLAY DEVICE AND DISPLAY SYSTEM PERFORMING THE SAME

(71) Applicant: Samsung Electronics Co., Ltd., Suwon-si (KR)

(72) Inventors: Jiheon Ok, Hwaseong-si (KR); Hyeonsu Park, Seoul (KR); Jooyoung An, Seoul (KR); Yonghoon Yu, Suwon-si (KR); Hyunwook Lim, Seoul (KR); Woohyuk Jang, Hwaseong-si (KR)

(73) Assignee: Samsung Electronics Co., Ltd., Gyeonggi-Do (KR)

( * ) Notice: Subject to any disclaimer, the term of this patent is extended or adjusted under 35 U.S.C. 154(b) by 353 days.

(21) Appl. No.: 17/348,151

(22) Filed: Jun. 15, 2021

(65) Prior Publication Data

US 2022/0139309 A1 May 5, 2022

(30) Foreign Application Priority Data

Nov. 4, 2020 (KR) ........................ 10-2020-0145957

(51) Int. Cl.
*G09G 3/3208* (2016.01)

(52) U.S. Cl.
CPC ... *G09G 3/3208* (2013.01); *G09G 2300/0439* (2013.01); *G09G 2320/045* (2013.01);
(Continued)

(58) Field of Classification Search
CPC ... G09G 3/30–3291; G09G 2300/0439; G09G 2320/0233; G09G 2320/0242;
(Continued)

(56) References Cited

U.S. PATENT DOCUMENTS 8,395,613 B2 3/2013 Okamoto et al.
9,311,848 B2 4/2016 Keum
(Continued)

FOREIGN PATENT DOCUMENTS

CN 102169679 A 8/2011
KR 10-2015-0081103 A 7/2015
(Continued)

OTHER PUBLICATIONS

CN Office Action for corresponding Chinese Patent Application No. 202111287421.3 issued on Jul. 23, 2025.

*Primary Examiner* — Keith L Crawley
(74) *Attorney, Agent, or Firm* — Harness, Dickey & Pierce, P.L.C.

(57) ABSTRACT

To compensate for degeneration of an electroluminescent display device, a method of compensating for the degeneration may include, grouping a plurality of pixels in a display panel into a plurality of pixel blocks arranged in present block rows and present block columns based on initial block boundaries, accumulating block stress values based on input image data, each accumulated block stress value representing a degeneration degree of the pixels included in each pixel block of the plurality of pixel blocks, performing a boundary updating operation on the plurality of pixel blocks, the performing the boundary updating operation including moving present block boundaries of the plurality of pixel blocks to updated block boundaries based on a distribution of the accumulated block stress values, and correcting the input image data based on the accumulated block stress values and the updated block boundaries.

19 Claims, 35 Drawing Sheets

(52) U.S. Cl.
CPC ... *G09G 2320/046* (2013.01); *G09G 2330/10* (2013.01); *G09G 2330/12* (2013.01)

(58) Field of Classification Search
CPC . G09G 2320/043–048; G09G 2330/10; G09G 2330/12; G09G 2340/16; G09G 2360/16
See application file for complete search history.

(56) References Cited

U.S. PATENT DOCUMENTS

| | | | | |
|---|---|---|---|---|
| 9,401,110 | B2 | 7/2016 | Lee et al. | |
| 9,773,455 | B2 | 9/2017 | Chung et al. | |
| 9,928,773 | B2 | 3/2018 | Kim et al. | |
| 9,947,265 | B2 | 4/2018 | Park et al. | |
| 10,803,800 | B2 | 10/2020 | An | |
| 2011/0205207 | A1 | 8/2011 | Hosaka et al. | |
| 2014/0160142 | A1* | 6/2014 | Lee | G09G 3/3208 345/589 |
| 2014/0232409 | A1* | 8/2014 | Keum | G09G 3/3225 324/414 |
| 2015/0194096 | A1* | 7/2015 | Chung | G09G 3/3225 345/78 |
| 2016/0086537 | A1 | 3/2016 | Shin | |
| 2016/0140895 | A1* | 5/2016 | Park | G09G 3/3208 345/690 |
| 2016/0189618 | A1* | 6/2016 | Park | G09G 3/3258 345/77 |
| 2017/0213493 | A1 | 7/2017 | Han | |
| 2018/0012563 | A1* | 1/2018 | Lee | G09G 5/10 |
| 2018/0020525 | A1* | 1/2018 | Moon | G09G 5/10 |
| 2019/0088199 | A1* | 3/2019 | Zhang | G09G 3/3208 |
| 2019/0164486 | A1* | 5/2019 | An | G09G 3/3233 |
| 2019/0221158 | A1 | 7/2019 | An | |
| 2019/0295510 | A1* | 9/2019 | Mobasher | G09G 3/3208 |
| 2020/0013326 | A1* | 1/2020 | Zheng | G09G 3/20 |
| 2020/0111455 | A1* | 4/2020 | Lee | G09G 3/2007 |
| 2020/0211454 | A1* | 7/2020 | Ohnishi | G09G 3/30 |

FOREIGN PATENT DOCUMENTS

| | | | |
|---|---|---|---|
| KR | 20150082807 | A | 7/2015 |
| KR | 20190062652 | A | 6/2019 |
| KR | 20190077846 | A | 7/2019 |

* cited by examiner

FIG. 9A

| VARIABLE | PB20 | PB21 | PB22 | PB23 | PB24 |
|---|---|---|---|---|---|
| $SX(2,k)_0$ | 0 | 2 | 4 | 6 | 8 |
| D(2,k) | 0 | 1 | 0.5 | 0.25 | 0 |
| ΔD(2,k) | - | 1 | 0.5 | 0.25 | 0.25 |
| ΔD_N(2,k) | - | 0.5 | 0.25 | 0.125 | 0.125 |
| ECNT(2,k) | - | 2 | 1 | 0.5→1 | 0.5→0 |
| SEQ(2,k) | 0 | 2 | 2 | 4 | 6 |
| MDIR(2,k) | - | (0) | (-) | (-) | (-) |
| $SX(2,k)_1$ | 0 | 2 | 3 | 5 | 7 |

FIG. 10A

| VARIABLE | PB20 | PB21 | PB22 | PB23 | PB24 |
|---|---|---|---|---|---|
| $SX(2,k)_1$ | 0 | 2 | 3 | 5 | 7 |
| D(2,k) | 0 | 1 | 0.75 | 0.5 | 0 |
| ΔD(2,k) | - | 1 | 0.25 | 0.25 | 0.5 |
| ΔD_N(2,k) | - | 0.5 | 0.125 | 0.125 | 0.25 |
| ECNT(2,k) | - | 2 | 0.5→1 | 0.5→0 | 1 |
| SEQ(2,k) | 0 | 2 | 2 | 3 | 7 |
| MDIR(2,k) | - | (0) | (-) | (-) | (0) |
| $SX(2,k)_2$ | 0 | 2 | 3 | 4 | 7 |

FIG. 11A

| VARIABLE | PB20 | PB21 | PB22 | PB23 | PB24 |
|---|---|---|---|---|---|
| $SX(2,k)_2$ | 0 | 2 | 3 | 4 | 7 |
| D(2,k) | 0 | 1 | 1 | 0.5 | 0 |
| ΔD(2,k) | - | 1 | 0 | 0.5 | 0.5 |
| ΔD_N(2,k) | - | 0.5 | 0 | 0.25 | 0.25 |
| ECNT(2,k) | - | 2 | 0 | 1 | 1 |
| SEQ(2,k) | 0 | 2 | 2 | 4 | 7 |
| MDIR(2,k) | - | (0) | (-) | (0) | (0) |
| $SX(2,k)_3$ | 0 | 2 | 3 | 4 | 7 |

FIG. 12A

| VARIABLE | PB00 | PB01 | PB02 | PB03 | PB04 |
|---|---|---|---|---|---|
| $SX(0,k)_0$ | 0 | 2 | 4 | 6 | 8 |
| D(0,k) | 0 | 0 | 0 | 0 | 0 |
| ΔD_N(0,k) | – | 0 | 0 | 0 | 0 |
| ECNT(0,k) | – | 0 | 0 | 0 | 0 |
| SEQ(0,k) | 0 | 0 | 0 | 0 | 0 |
| MDIR(0,k) | – | (0) | (0) | (0) | (0) |
| $SX(0,k)_1$ | 0 | 2 | 4 | 6 | 8 |

BU01

FIG. 12B

| | VARIABLE | PB10 | PB11 | PB12 | PB13 | PB14 |
|---|---|---|---|---|---|---|
| | $SX(1,k)_0$ | 0 | 2 | 4 | 6 | 8 |
| | D(1,k) | 0 | 0.5 | 0.5 | 0.5 | 0 |
| | ΔD(1,k) | - | 0.5 | 0 | 0 | 0.5 |
| BU01 | ECNT(1,k) | - | 2 | 0 | 0 | 2 |
| | SEQ(1,k) | 0 | 2 | 2 | 8 | 8 |
| | MDIR(1,k) | - | (0) | (-) | (+) | (0) |
| | $SX(1,k)_1$ | 0 | 2 | 3 | 7 | 8 |
| | D(1,k) | 0 | 0.5 | 0.5 | 0.5 | 0 |
| | ΔD(1,k) | - | 0.5 | 0 | 0 | 0.5 |
| BU02 | ECNT(1,k) | - | 2 | 0 | 0 | 2 |
| | SEQ(1,k) | 0 | 2 | 2 | 8 | 6 |
| | MDIR(1,k) | - | (0) | (-) | (+) | (0) |
| | $SX(1,k)_2$ | 0 | 2 | 3 | 7 | 8 |

FIG. 12C

| | VARIABLE | PB20 | PB21 | PB22 | PB23 | PB24 |
|---|---|---|---|---|---|---|
| | $SX(2,k)_0$ | 0 | 2 | 4 | 6 | 8 |
| | D(2,k) | 0 | 1 | 0.5 | 0.25 | 0 |
| | ΔD(2,k) | – | 1 | 0.5 | 0.25 | 0.25 |
| BU01 | ECNT(2,k) | – | 2 | 1 | 0.5→1 | 0.5→0 |
| | SEQ(2,k) | 0 | 2 | 2 | 4 | 6 |
| | MDIR(2,k) | – | (0) | (–) | (–) | (–) |
| | $SX(2,k)_1$ | 0 | 2 | 3 | 5 | 7 |
| | D(2,k) | 0 | 1 | 0.75 | 0.5 | 0 |
| | ΔD(2,k) | – | 1 | 0.25 | 0.25 | 0.5 |
| BU02 | ECNT(2,k) | – | 2 | 0.5→1 | 0.5→0 | 1 |
| | SEQ(2,k) | 0 | 2 | 2 | 3 | 7 |
| | MDIR(2,k) | – | (0) | (–) | (–) | (0) |
| | $SX(2,k)_2$ | 0 | 2 | 3 | 4 | 7 |
| | D(2,k) | 0 | 1 | 1 | 0.5 | 0 |
| | ΔD(2,k) | – | 1 | 0 | 0.5 | 0.5 |
| BU03 | ECNT(2,k) | – | 2 | 0 | 1 | 1 |
| | SEQ(2,k) | 0 | 2 | 2 | 4 | 7 |
| | MDIR(2,k) | – | (0) | (–) | (0) | (0) |
| | $SX(2,k)_3$ | 0 | 2 | 3 | 4 | 7 |

FIG. 12D

| | VARIABLE | PB40 | PB41 | PB42 | PB43 | PB44 |
|---|---|---|---|---|---|---|
| | $SX(4,k)_0$ | 0 | 2 | 4 | 6 | 8 |
| | D(4,k) | 0 | 1 | 0.5 | 0 | 0 |
| | ΔD(4,k) | – | 1 | 0.5 | 0.5 | 0 |
| BU01 | ECNT(4,k) | – | 2 | 1 | 1 | 0 |
| | SEQ(4,k) | 0 | 2 | 2 | 4 | 6 |
| | MDIR(4,k) | – | (0) | (–) | (–) | (–) |
| | $SX(4,k)_1$ | 0 | 2 | 3 | 5 | 7 |
| | D(4,k) | 0 | 1 | 0.75 | 0.25 | 0 |
| | ΔD(4,k) | – | 1 | 0.25 | 0.5 | 0.25 |
| BU02 | ECNT(4,k) | – | 2 | 0.5→1 | 1 | 0.5→0 |
| | SEQ(4,k) | 0 | 2 | 2 | 3 | 5 |
| | MDIR(4,k) | – | (0) | (–) | (–) | (–) |
| | $SX(4,k)_2$ | 0 | 2 | 3 | 4 | 6 |
| | D(4,k) | 0 | 1 | 1 | 0.5 | 0 |
| | ΔD(4,k) | – | 1 | 0 | 0.5 | 0.5 |
| BU03 | ECNT(4,k) | – | 2 | 0 | 1 | 1 |
| | SEQ(4,k) | 0 | 2 | 2 | 4 | 6 |
| | MDIR(4,k) | – | (0) | (–) | (0) | (0) |
| | $SX(4,k)_3$ | 0 | 2 | 3 | 4 | 6 |

FIG. 12E

| | VARIABLE | PB50 | PB51 | PB52 | PB53 | PB54 |
|---|---|---|---|---|---|---|
| | $SX(5,k)_0$ | 0 | 2 | 4 | 6 | 8 |
| | D(5,k) | 0 | 0.75 | 0 | 0 | 0 |
| | ΔD(5,k) | – | 0.75 | 0.75 | 0 | 0 |
| BU01 | ECNT(5,k) | – | 2 | 2 | 0 | 0 |
| | SEQ(5,k) | 0 | 2 | 2 | 4 | 4 |
| | MDIR(5,k) | – | (0) | (–) | (–) | (–) |
| | $SX(5,k)_1$ | 0 | 2 | 3 | 5 | 7 |
| | D(5,k) | 0 | 1 | 0.25 | 0 | 0 |
| | ΔD(5,k) | – | 1 | 0.75 | 0.25 | 0 |
| BU02 | ECNT(5,k) | – | 2 | 1.5→2 | 0.5→0 | 0 |
| | SEQ(5,k) | 0 | 2 | 2 | 3 | 3 |
| | MDIR(5,k) | – | (0) | (–) | (–) | (–) |
| | $SX(5,k)_2$ | 0 | 2 | 3 | 4 | 6 |
| | D(5,k) | 0 | 1 | 0.5 | 0 | 0 |
| | ΔD(5,k) | – | 1 | 0.5 | 0.5 | 0 |
| BU03 | ECNT(5,k) | – | 2 | 1 | 1 | 0 |
| | SEQ(5,k) | 0 | 2 | 2 | 3 | 4 |
| | MDIR(5,k) | – | (0) | (–) | (–) | (–) |
| | $SX(5,k)_3$ | 0 | 2 | 3 | 4 | 5 |
| | D(5,k) | 0 | 1 | 0.5 | 0 | 0 |
| | ΔD(5,k) | – | 1 | 0.5 | 0.5 | 0 |
| BU04 | ECNT(5,k) | – | 2 | 1 | 1 | 0 |
| | SEQ(5,k) | 0 | 2 | 2 | 3 | 4 |
| | MDIR(5,k) | – | (0) | (–) | (–) | (–) |
| | $SX(5,k)_4$ | 0 | 2 | 3 | 4 | 5 |

FIG. 14

| | VARIABLE | PB01 | PB11 | PB21 | PB31 | PB41 | PB51 | PB61 |
|---|---|---|---|---|---|---|---|---|
| BU01 | $SY(k,1)_0$ | 0 | 2 | 4 | 6 | 8 | 10 | 12 |
| | D(k,1) | 0 | 0.5 | 1 | 1 | 1 | 0.75 | 0 |
| | ΔD(k,1) | – | 0.5 | 0.5 | 0 | 0 | 0.25 | 0.75 |
| | ECNT(k,1) | – | 1.5→2 | 1.5→1 | 0 | 0 | 0.75→1 | 2.25→2 |
| | SEQ(k,1) | 0 | 2 | 2 | 4 | 10 | 12 | 12 |
| | MDIR(k,1) | – | (0) | (–) | (–) | (+) | (+) | (0) |
| | $SX(k,1)_1$ | 0 | 2 | 3 | 5 | 9 | 11 | 12 |
| BU02 | D(k,1) | 0 | 0 | 1 | 1 | 1 | 0.5 | 0 |
| | ΔD(k,1) | – | 0 | 1 | 0 | 0 | 0.5 | 0.5 |
| | ECNT(k,1) | – | 0 | 3 | 0 | 0 | 1.5→2 | 1.5→1 |
| | SEQ(k,1) | 0 | 3 | 3 | 3 | 11 | 11 | 12 |
| | MDIR(k,1) | – | (+) | (0) | (–) | (+) | (0) | (0) |
| | $SY(k,1)_2$ | 0 | 2 | 3 | 4 | 10 | 11 | 12 |
| BU03 | D(k,1) | 0 | 0 | 1 | 1 | 1 | 0.5 | 0 |
| | ΔD(k,1) | – | 0 | 1 | 0 | 0 | 0.5 | 0.5 |
| | ECNT(k,1) | – | 0 | 3 | 0 | 0 | 1.5→2 | 1.5→1 |
| | SEQ(k,1) | 0 | 3 | 3 | 3 | 11 | 11 | 12 |
| | MDIR(k,1) | – | (+) | (0) | (–) | (+) | (0) | (0) |
| | $SY(k,1)_3$ | 0 | 2 | 3 | 4 | 10 | 11 | 12 |

FIG. 23

| | PB20 | | PB21 | | PB22 | | PB23 | | PB23 | |
|---|---|---|---|---|---|---|---|---|---|---|
| | PX20 | PX21 | PX22 | PX23 | PX24 | PX25 | PX26 | PX27 | PX28 | PX29 |
| D | 0 | 0 | 1 | 1 | 0.5 | 0.5 | 0.25 | 0.25 | 0 | 0 |
| LPF | 0 | 0.333 | 0.667 | 0.833 | 0.667 | 0.417 | 0.333 | 0.167 | 0.083 | 0 |
| CDF | 0 | 0.333 | 1.000 | 1.833 | 2.500 | 2.917 | 3.250 | 3.417 | 3.500 | 3.500 |
| CDF_D | 0 | 0.095 | 0.286 | 0.524 | 0.714 | 0.833 | 0.929 | 0.976 | 1 | 1 |

10

11

METHOD OF COMPENSATING FOR DEGENERATION OF ELECTROLUMINESCENT DISPLAY DEVICE AND DISPLAY SYSTEM PERFORMING THE SAME

CROSS-REFERENCE TO RELATED APPLICATION

This U.S. non-provisional application claims the benefit of priority under 35 USC § 119 to Korean Patent Application No. 10-2020-0145957, filed on Nov. 4, 2020, in the Korean Intellectual Property Office (KIPO), the disclosure of which is incorporated by reference herein in its entirety.

BACKGROUND

Various example embodiments relate generally to semiconductor integrated circuits, and more particularly to an electroluminescent display device, a method of compensating for degeneration of an electroluminescent display device and/or a display system performing the method.

An electroluminescent display may have a fast response speed and low power consumption compared to other types of displays. This improved performance may be achieved, at least in part, through the use of pixels that use light emitting diodes (LEDs) or organic light-emitting diodes (OLEDs). For example, an OLED emits light based on a recombination of electrons and holes in a light-emitting layer located between an anode and cathode. The light-emitting layer includes a material that emits light based on the driving current flowing between the anode and cathode. The luminance of the light is based on the amount of driving current, e.g., higher driving currents may produce higher brightness of light in the displayed image.

In an electroluminescent display, the pixels may become stressed and degenerate depending, for example, on the amount and/or level of the driving currents. The degeneration may worsen with increased amounts of stress due to the driving currents over time. As a result, a luminance drop in the electroluminescent display may occur, which degrades the display quality of the electroluminescent display.

SUMMARY

Some example embodiments may provide a method, a display device, and/or a display system capable of efficiently compensating for degeneration of pixels of an electroluminescent display device.

According to at least one example embodiment, a method of compensating for degeneration of an electroluminescent display device, includes, grouping a plurality of pixels in a display panel into a plurality of pixel blocks arranged in present block rows and present block columns based on initial block boundaries, accumulating block stress values based on input image data, each accumulated block stress value representing a degeneration degree of the pixels included in each pixel block of the plurality of pixel blocks, performing a boundary updating operation on the plurality of pixel blocks, the performing the boundary updating operation including moving present block boundaries of the plurality of pixel blocks to updated block boundaries based on a distribution of the accumulated block stress values, and correcting the input image data based on the accumulated block stress values and the updated block boundaries.

According to at least one example embodiment, an electroluminescent display device includes a display panel including a plurality of pixels and at least one degeneration compensating logic configured to group the plurality of pixels into a plurality of pixel blocks arranged in present block rows and present block columns based on initial block boundaries, accumulate block stress values associated with each pixel block based on input image data, each accumulated block stress value representing a degeneration degree of the pixels included in each pixel block of the plurality of pixel blocks, perform a boundary updating operation on the plurality of pixel blocks, the performing the boundary updating operation including moving present block boundaries of the plurality of pixel blocks to updated block boundaries based on a distribution of the accumulated block stress values, and correct the input image data based on the accumulated block stress values and the updated block boundaries.

According to at least one example embodiment, a display system includes a display panel including a plurality of pixels, a display controller, and a display driving integrated circuit. The display controller is configured to group all of the plurality of pixels into a plurality of first pixel blocks, and provide first accumulated block stress values based on input image data, each of the first accumulated block stress values representing a degeneration degree of the pixels included in each of the plurality of first pixel blocks. The display driving integrated circuit is configured to group at least a portion of the plurality of pixels into a plurality of second pixel blocks, and provide second accumulated block stress values based on the input image data, each of the second accumulated block stress values representing a degeneration degree of the pixels included in each of the plurality of second pixel blocks.

The method of compensating for degeneration of the electroluminescent display device, the electroluminescent display device, and/or the display system according to one or more example embodiments may compensate for the degeneration of the pixels efficiently by reducing the data amount of the accumulated stress data through a grouping of the pixels.

The method of compensating for degeneration of the electroluminescent display device, the electroluminescent display device, and/or the display system according to one or more example embodiments may enhance a quality of the displayed image by updating the block boundaries based on the accumulated stress data to reflect and/or exactly reflect the degeneration state of the pixels.

The method of compensating for degeneration of the electroluminescent display device, the electroluminescent display device, and/or the display system according to one or more example embodiments may enhance an accuracy of compensation through respective management of the stress data by the display controller and the display driving integrated circuit.

BRIEF DESCRIPTION OF THE DRAWINGS

Various example embodiments of the inventive concepts will be more clearly understood from the following detailed description taken in conjunction with the accompanying drawings.

FIGS. 9A through 11B are diagrams illustrating the boundary updating operation of FIG. 8 with respect to one block row in FIG. 7 according to some example embodiments.

FIGS. 12A through 12E are diagrams illustrating the boundary updating operation with respect to all block rows in FIG. 7 according to some example embodiments.

FIGS. 14 and 15 are diagrams illustrating the boundary updating operation of FIG. 8 with respect to one block row in FIG. 7 according to some example embodiments.

FIGS. 22, 23 and 24 are diagrams illustrating the boundary updating operation of FIG. 21 with respect to one block row in FIG. 7 according to some example embodiments.

FUG. 25 is a block diagram illustrating a display system according to some example embodiments.

Figure 26:
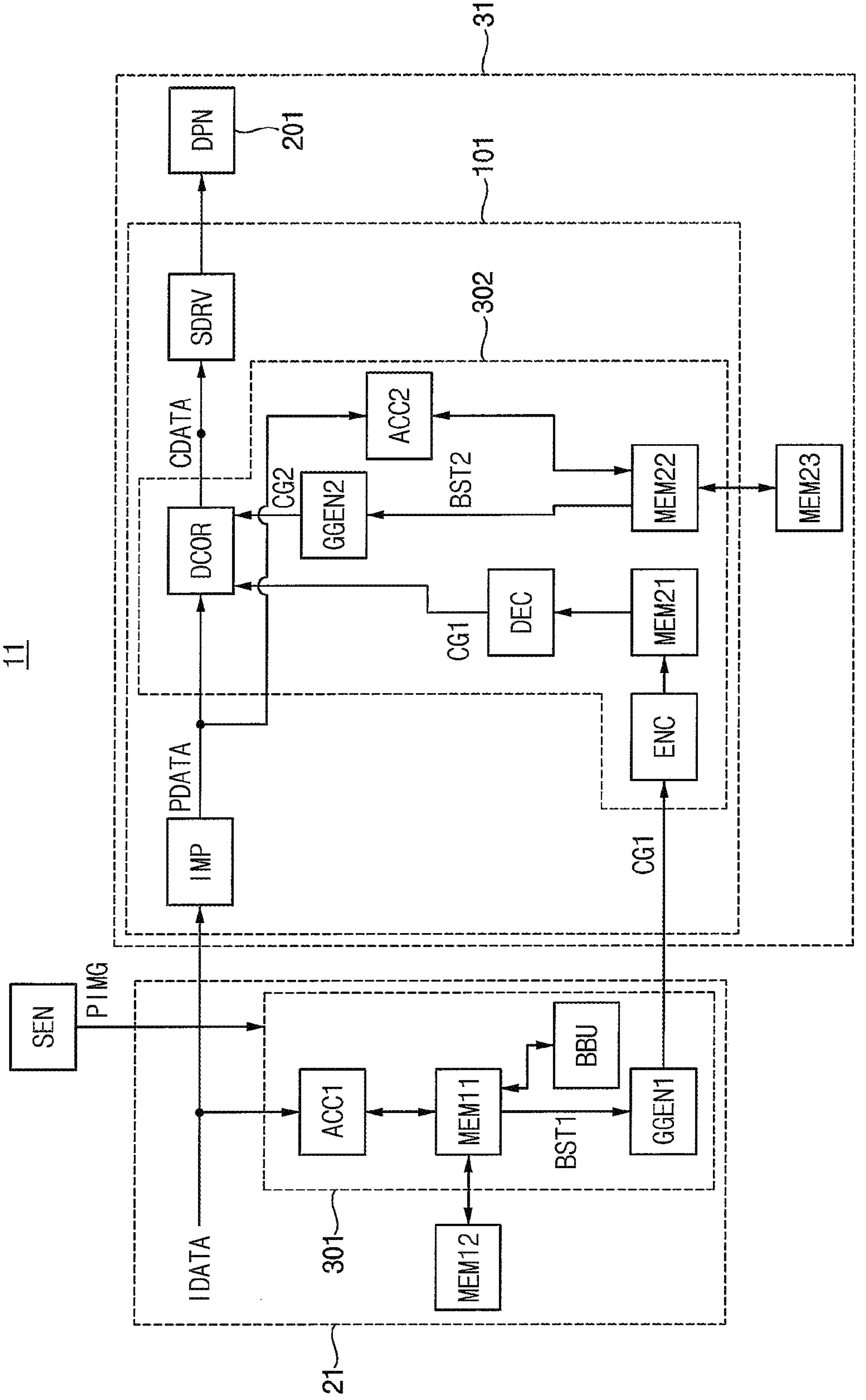

FIG. 26 is a block diagram illustrating a display system according to some example embodiments.

Figure 27:
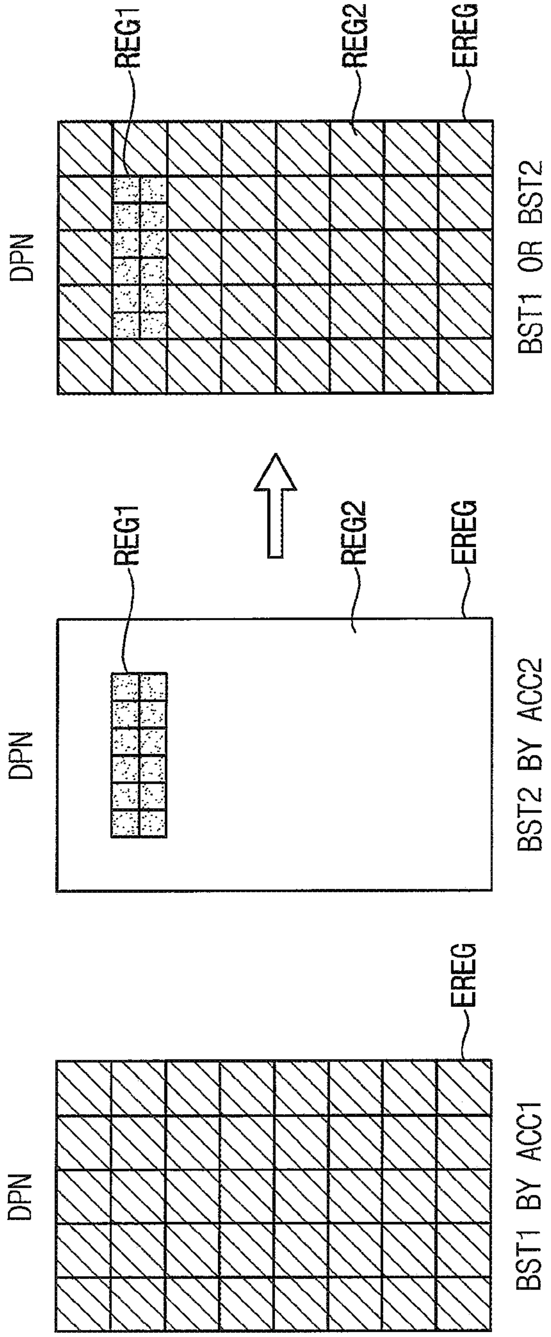

FIG. 27 is a diagram illustrating a region compensating operation in a display system according to some example embodiments.

Figure 28:
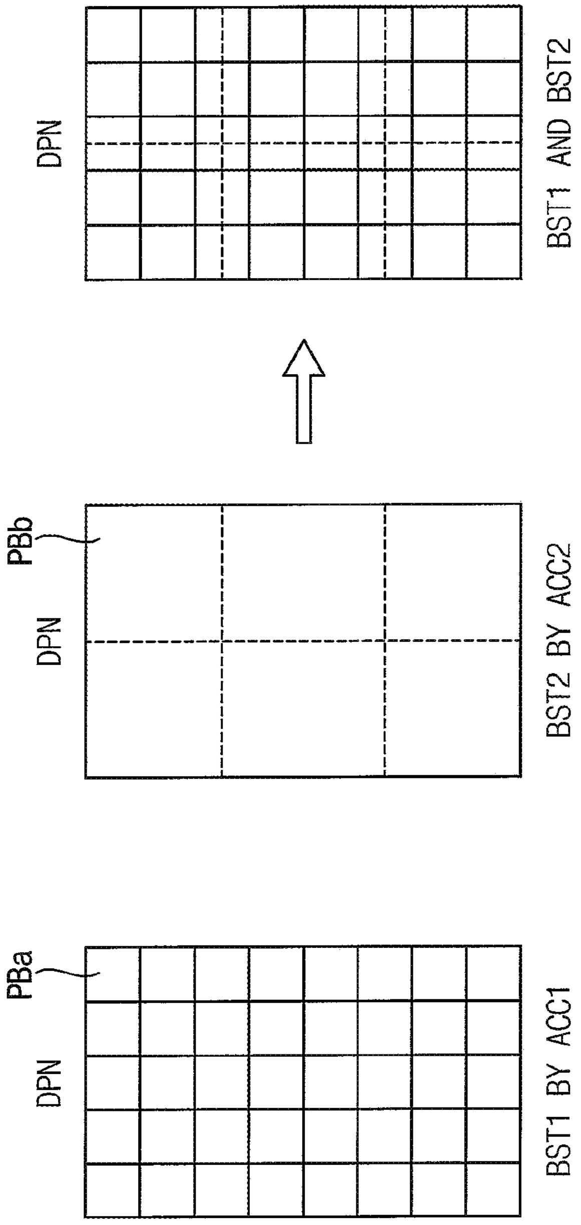

FIG. 28 is a diagram illustrating a data compensating operation in a display system according to some example embodiments.

Figure 29:
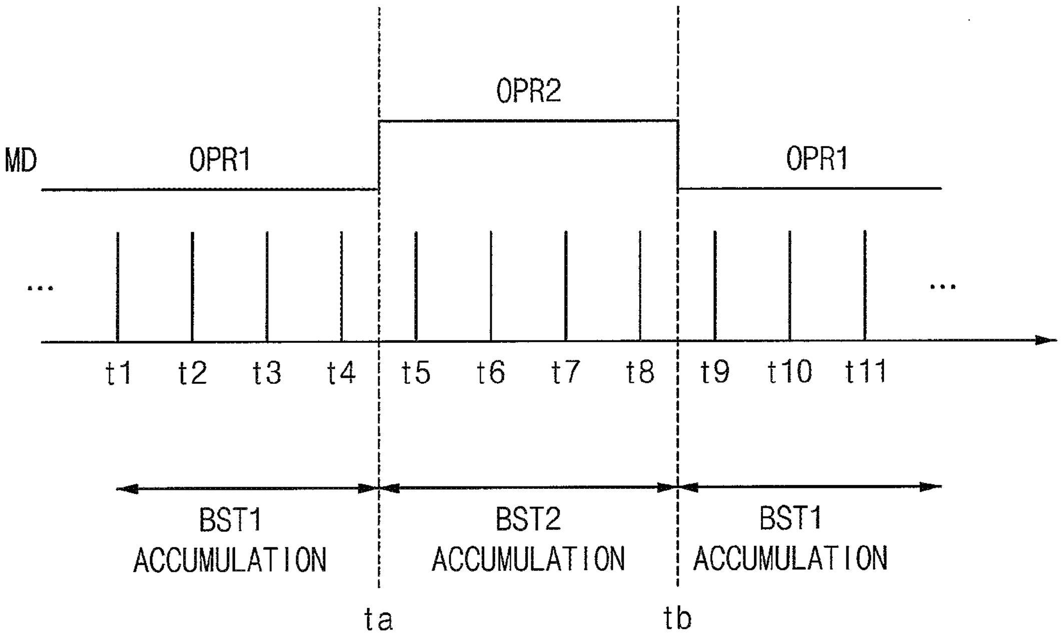

FIG. 29 is a diagram illustrating an accumulation period compensating operation in a display system according to some example embodiments.

DETAILED DESCRIPTION

Various example embodiments will be described more fully hereinafter with reference to the accompanying drawings, in which some example embodiments are shown. In the drawings, like numerals refer to like elements throughout. The repeated descriptions may be omitted.

Figure 1:
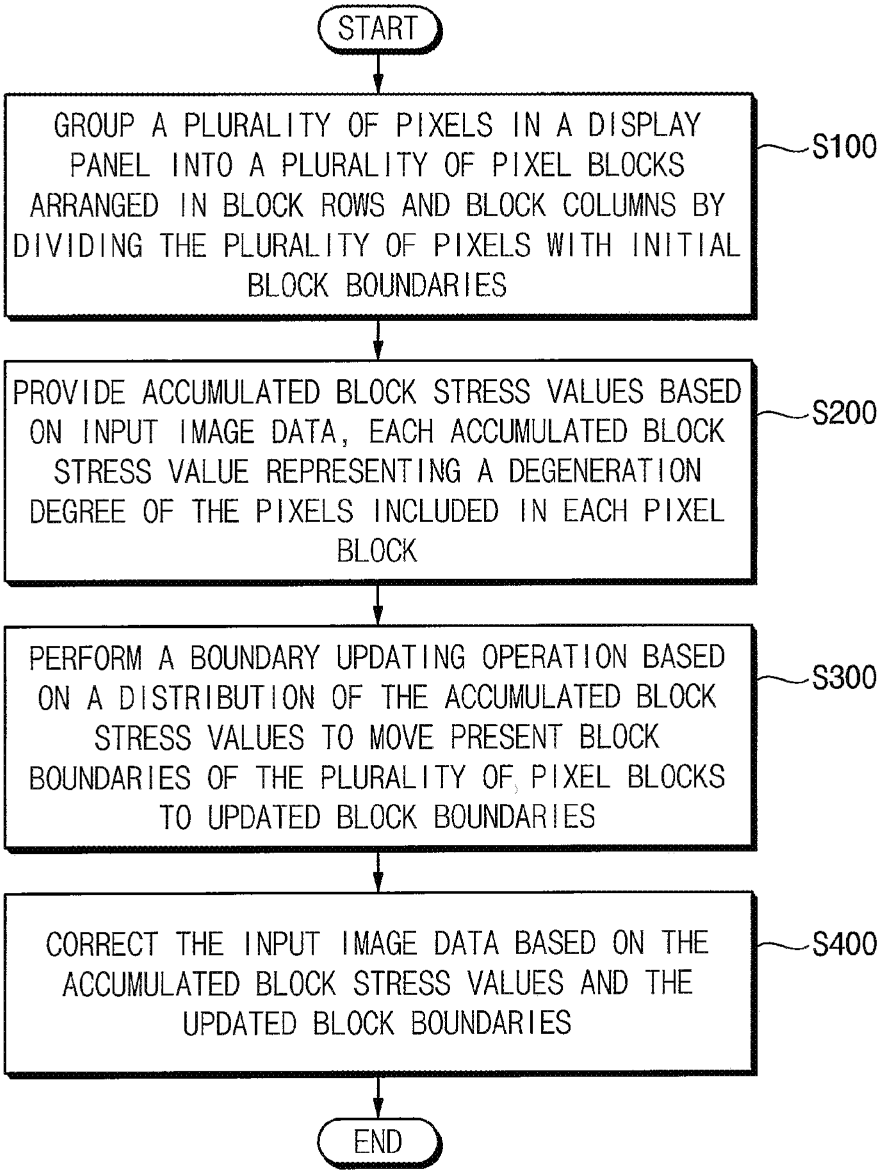
FIG. 1 is a flow chart illustrating a method of compensating for degeneration of an electroluminescent display device according to some example embodiments.

FIG. 1 is a flow chart illustrating a method of compensating for degeneration of an electroluminescent display device according to some example embodiments.

Referring to FIG. 1, according to at least one example embodiment, in operation S100, a plurality of pixels in a display panel may be grouped into a plurality of pixel blocks arranged in block rows and block columns by dividing the plurality of pixels with initial block boundaries by a display driver of the display panel (e.g., display driver 100 of FIG. 2, etc.), but the example embodiments are not limited thereto. Some example embodiments of pixel grouping will be described with reference to FIG. 5.

In operation S200, the display driver may accumulate (e.g., determine, calculate, etc.) block stress values based on image data to the display panel and/or the block stress values associated with the image data may be provided to the display driver, but the example embodiments are not limited thereto. Additionally, each accumulated block stress value may represent a degeneration degree (and/or an expected degree of degeneration, a predicted degree of degeneration, etc.) of the pixels included in each pixel block (S200).

For example, block average values may be calculated by the display driver based on input image data of each frame, where each block average value represents an average grayscale value of the pixels in each pixel block, but the example embodiments are not limited thereto. Each block average value may be accumulated by the display driver with respect to a plurality of frames to store and provide the accumulated block stress values, but the example embodiments are not limited thereto, and for example, the block average value may be based on a single image frame, etc. The degeneration of the pixels may be efficiently compensated by reducing the data amount of the stress values through the grouping of the pixels.

In operation S300, a boundary updating operation may be performed by the display driver based on a distribution of the accumulated block stress values to move present block boundaries of the plurality of pixel blocks to updated block boundaries.

In some example embodiments, the present block boundaries (e.g., current block boundaries, first block boundaries, etc.) may be moved by the display driver to the updated block boundaries (e.g., future block boundaries, next block boundaries, second block boundaries, etc.), such that the updated block boundaries are more concentrated in a region of the display panel in which a difference between degeneration degrees of adjacent pixel blocks is greater than a desired and/or threshold degeneration degree value. In other words, the present block boundaries may be moved by the display driver to the updated block boundaries such that the updated block boundaries may be concentrated or compact near burn-in boundaries indicating a degeneration pattern of the plurality of pixels, but the example embodiments are not limited thereto. According to some example embodiments, the desired and/or threshold degeneration degree value may be a configuration setting set by a user and/or a display manufacturer, etc., and/or may be based on a comparison of a region to other regions of the display panel, etc. Some example embodiments of such boundary updating operation will be described below with reference to FIGS. 8 through 16.

In some example embodiments, the present block boundaries may be moved by the display driver to the updated block boundaries such that the updated block boundaries are more concentrated and/or changed to be in a region of the display panel in which a degeneration degree is greater than a desired and/or threshold degeneration degree value. In other words, the present block boundaries may be moved by the display driver to the updated block boundaries such that the updated block boundaries may be concentrated or compact in the region of higher degeneration degree. Some example embodiments of such boundary updating operation will be described below with reference to FIGS. 21 through 24.

In operation S400, the input image data may be corrected by the display driver based on the accumulated block stress values and the updated block boundaries. The pixels in the display panel may be driven and/or operated by the display driver based on the corrected image data.

The memory capacity used and/or the data bandwidth used may be reduced and/or decreased through the grouping of the pixels but the values representing the pixel block cannot exactly reflect the degeneration distribution of the pixels included in each pixel block. The block boundaries between pixel blocks may be visible to and/or recognized by a user and thus the quality and/or performance of the degeneration compensation may be degraded. According to some example embodiments, the degeneration pattern may be reflected exactly and the quality of displayed image may be enhanced by changing the block boundaries such that the block boundaries reflect exactly and/or accurately reflect the real burn-in boundaries and/or the burn-in regions.

Figure 2:
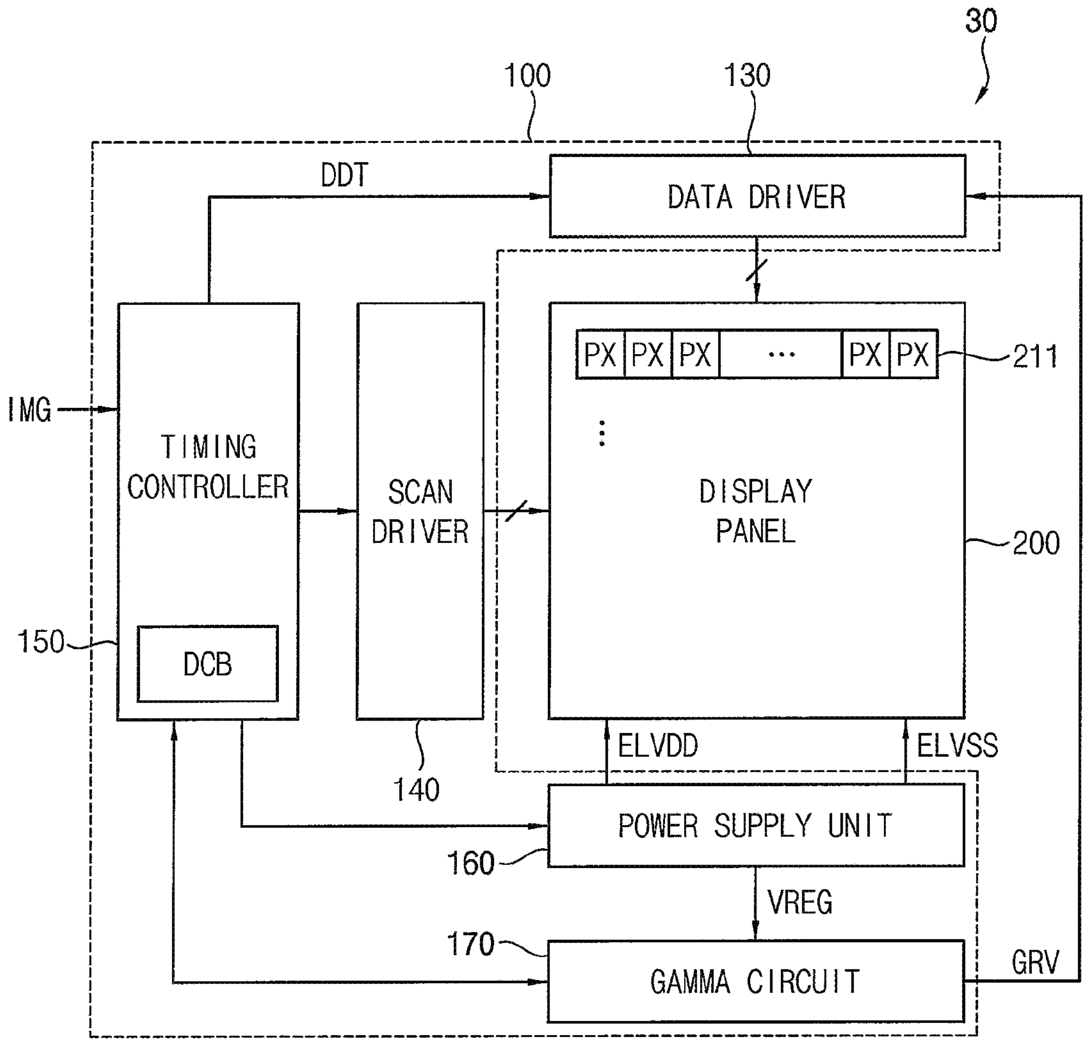
FIG. 2 is a block diagram illustrating an electroluminescent display device according to some example embodiments.

FIG. 2 is a block diagram illustrating an electroluminescent display device according to some example embodiments.

Referring to FIG. 2, an electroluminescent display device 30 may include a display panel 200 including a plurality of pixel rows 211 and/or a display driver 100 that drives (e.g., operates) the display panel 200, etc., but the example embodiments are not limited thereto, and for example, the electroluminescent display device 30 may include a greater or lesser number of constituent elements. In at least one example embodiment, the display driver 100 may include a data driver 130, a scan driver 140, a timing controller 150, a power supply 160, and/or a gamma circuit 170, etc., but is not limited thereto.

The display panel 200 may be connected to the data driver 130 of the display driver 100 through a plurality of data lines, and may be connected to the scan driver 140 of the display driver 100 through a plurality of scan lines. The display panel 200 may include the pixel rows 211, e.g., a plurality of pixel rows, etc. That is, the display panel 200 may include a plurality of pixels PX arranged in a matrix having a plurality of rows and a plurality of columns. One row of pixels PX connected to the same scan line may be referred to as one pixel row 211. In some example embodiments, the display panel 200 may be a self-emitting display panel that emits light without the use of a back light unit, but is not limited thereto. For example, the display panel 200 may be an organic light-emitting diode (OLED) display panel, but is not limited thereto.

Each pixel PX included in the display panel 200 may have various configurations according to a driving (e.g., operating) scheme of the display device 30. For example, the electroluminescent display device 30 may be driven and/or operated with an analog or a digital driving (and/or operating) method. While the analog driving method produces grayscale using variable voltage levels corresponding to input data (e.g., image data input to the display device 30), the digital driving method produces grayscale using variable time duration in which the LED emits light. The analog driving method is difficult to implement because the analog driving method uses a driving integrated circuit (IC) that is complicated to manufacture if the display is large and has high resolution. The digital driving method, on the other hand, may readily accomplish high resolution through a simpler IC structure. As the size of the display panel becomes larger and/or the resolution of the display panel increases, the digital driving method may have more favorable characteristics over the analog driving method. The method of compensating for degeneration according to some example embodiments may be applied to both of the analog driving method and the digital driving method.

The data driver 130 may apply a data signal to the display panel 200 through the data lines. The scan driver 140 may apply a scan signal to the display panel 200 through the scan lines.

The timing controller 150 may control the operation of the display device 30. The timing controller 150 may provide control signals to the data driver 130 and/or the scan driver 140 to control the operations of the display device 30. The control signals may be desired and/or predetermined. In some example embodiments, the data driver 130, the scan driver 140 and the timing controller 150 may be implemented as one integrated circuit (IC). In other example embodiments, the data driver 130, the scan driver 140 and the timing controller 150 may be implemented as two or more integrated circuits. A driving module including at least the timing controller 150 and the data driver 130 may be referred to as a timing controller embedded data driver (TED). According to some example embodiments, the display driver 100, timing controller 150, and/or the driving module may be implemented as processing circuitry, or in other words, processing circuitry included in the display device 30 may be capable of performing the functionality of one or more of the data driver 130, the scan driver 140 and the timing controller 150, etc. The processing circuitry may include hardware, such as processors, processor cores, logic circuits, storage devices, etc.; a hardware/software combination such as at least one processor core executing software and/or executing any instruction set, etc.; or a combination thereof. For example, the processing circuitry more specifically may include, but is not limited to, a field programmable gate array (FPGA), a programmable logic unit, an application-specific integrated circuit (ASIC), s System-on-Chip (SoC), etc.

The timing controller 150 may receive the input image data IMG and the input control signals from, for example, the host device 20. The input image data IMG may include red (R) image data, green (G) image data and blue (B) image data, but the example embodiments are not limited thereto. According to some example embodiments, the input image data IMG may include white image data, magenta image data, yellow image data, cyan image data, and so on. The input control signals may include a master clock signal, a data enable signal, a horizontal synchronization signal, a vertical synchronization signal, and so on, and are not limited thereto.

The power supply 160 may supply the display panel 200 with a high power supply voltage ELVDD and/or a low power supply voltage ELVSS, etc. In addition, the power supply 160 may supply a regulator voltage VREG to the gamma circuit 170. The gamma circuit 170 may generate gamma reference voltages GRV based on the regulator voltage VREG.

The luminance compensation circuit 100 may, based on a plurality of input pixel values corresponding to a plurality of pixels, generate a global current value indicating a global current flowing through a display panel, generate a global compensation value indicating a global luminance deviation according the global current with respect to each of the plurality of input pixel values, and/or generate a gamma compensation value indicating a gamma distortion caused by compensating the input pixel value, but is not limited thereto. In addition, the luminance compensation circuit 100 may generate a compensated pixel value based on the input pixel value, the global compensation value and/or the gamma compensation value, etc.

The timing controller 150 may include a degeneration compensating logic DCB (e.g., DCB logic circuitry, DCB processing circuitry, etc.) configured to perform the method of compensating for degeneration of the electroluminescent display device 30 as described with reference to FIG. 1. Some example embodiments of the degeneration compensating logic DCB will be described below with reference to FIG. 6. In some example embodiments, the degeneration compensating logic DCB may be implemented a component distinct from the timing controller 150, but the example embodiments are not limited thereto.

Figure 3:
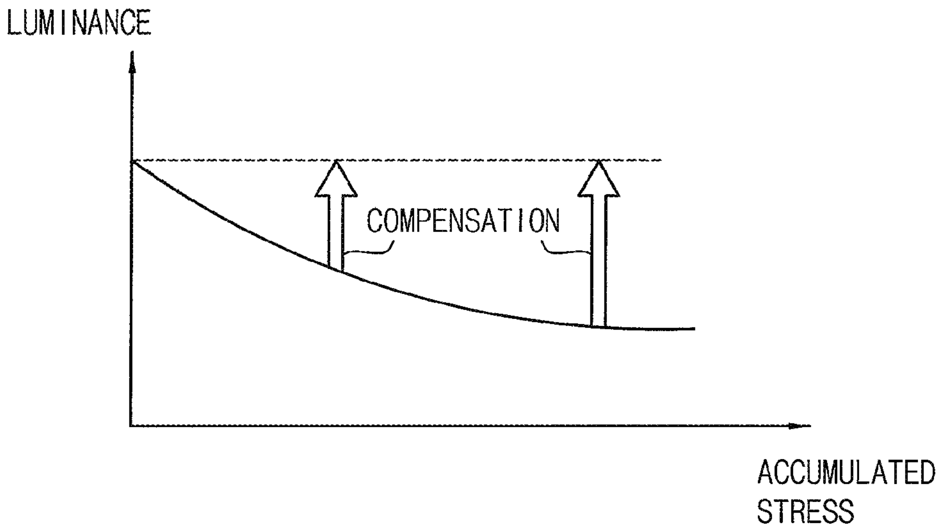
FIG. 3 is a diagram illustrating a luminance drop that may occur as a result of accumulated stress of pixels.
Figure 4:
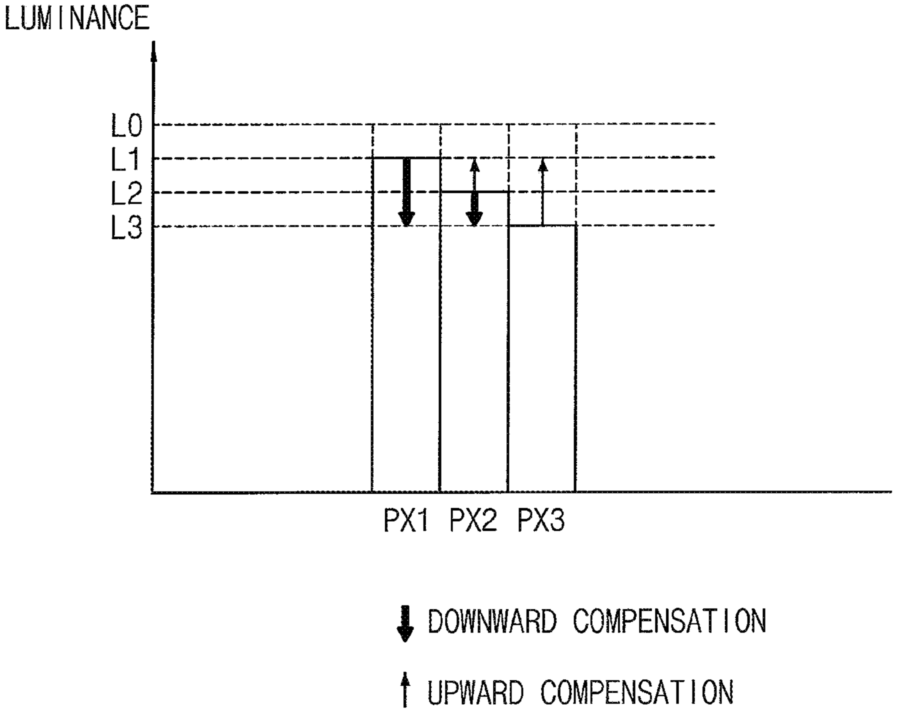
FIG. 4 is a diagram illustrating a compensation operation that compensates for a degeneration of pixels according to some example embodiments.

FIG. 3 is a diagram illustrating a luminance drop that may occur as a result of accumulated stress of pixels, and FIG. 4 is a diagram illustrating a compensation operation that compensates for a degeneration of pixels according to some example embodiments.

Referring to FIG. 3, the luminance drop may increase as the accumulated stress increases and/or degeneration of the pixel becomes more severe. Additionally, the luminance drop may degrade the quality of the displayed image. To reduce and/or prevent these effects, luminance may be compensated based on the degree of degeneration. For example, as illustrated in FIG. 3, the amount of luminance compensation may be determined depending on and/or based on the accumulated stress of the pixels, but is not limited thereto.

The accumulated stress of a pixel may correspond to a brightness (e.g., a brightness level) of the displayed image, e.g., the grayscale values of the input image data. The amount of the luminance compensation may be anticipated, calculated, and/or determined based on information corresponding to the accumulation of the grayscale values of the respective pixels. The stress data (e.g., the accumulated grayscale values) may be stored in a non-volatile memory device, such as a flash memory device, etc. The amount (and/or value) of the stress data per pixel may increase significantly as the resolution of the display panel and/or the number of accumulated frames is increased. This may result in an increase in hardware costs/complexity and/or an increase of the bandwidth of data from and to the non-volatile memory device for storing the stress data. According to some example embodiments, these effects may be reduced and/or prevented by grouping pixels in the manner as will be described below with reference to FIG. 5.

Referring to FIG. 4, the displayed luminance L1, L2 and L3 may be different depending on and/or based on the degeneration degrees of pixels PX1, PX2 and PX3 even though the pixels PX1, PX2 and PX3 are driven and/or operated based on the same data corresponding to the original luminance L0. For example, the stress value of the pixel PX2 may be greater than the stress value of the pixel PX1, and the stress value of the pixel PX3 may be greater than the stress value of the pixel PX2, but the example embodiments are not limited thereto. As the driving time (e.g., operating time) and/or the driving amount (e.g., operating amount) of a pixel increases, that is, as the accumulated stress imposed on a pixel increases, the OLED in the pixel is degenerated and/or deteriorated more and the luminance of the pixel may be reduced.

According to at least one example embodiment, to reduce the effects of the pixel degeneration, the stress value of a pixel may be converted to a compensation gain based on a relationship between the accumulated stress value and the luminance drop. As illustrated in FIG. 4, a downward compensation may be adopted and/or provided such that the compensation gain is adjusted based on the pixel PX3 and/or the region corresponding to the highest degeneration, or an upward compensation may be adopted and/or provided such that the compensation gain is adjusted based on the pixel PX1 and/or the region corresponding to the lowest degeneration. In some example embodiments, the compensation gain may be increased with respect to some pixels and may be decreased with respect to other pixels based on the intermediate luminance between the luminance range L1~L3, but the example embodiments are not limited thereto, and other luminance values may be used.

Figure 5:
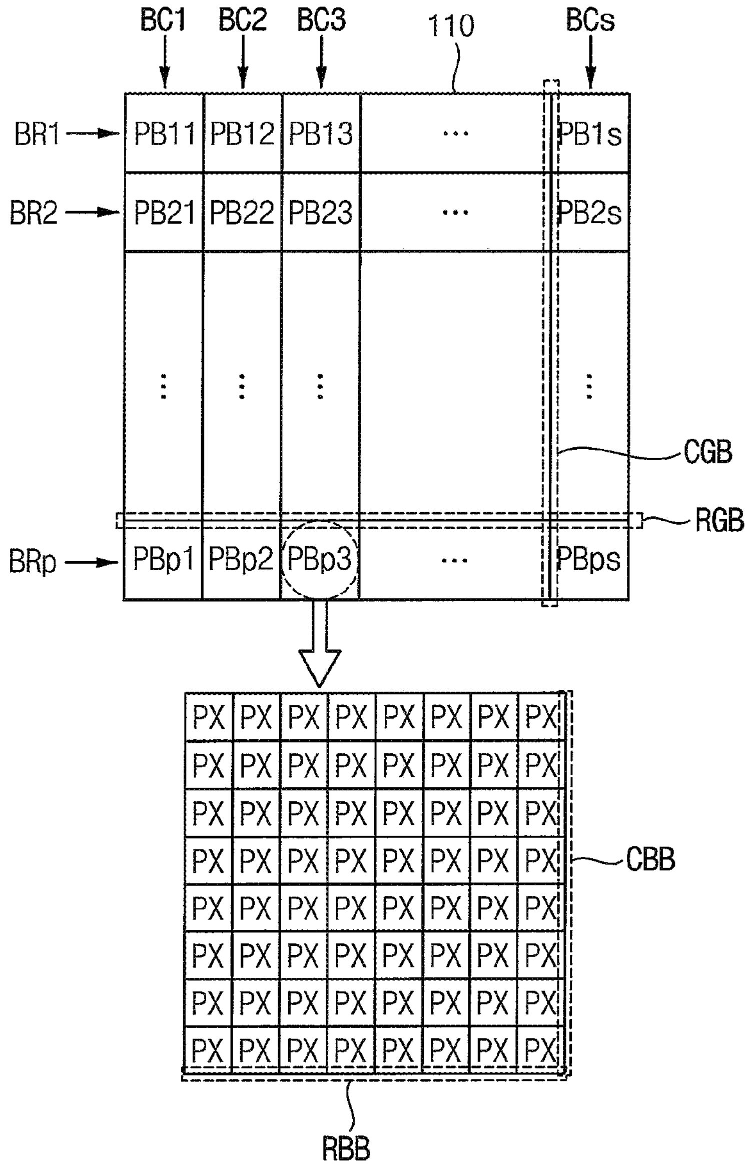
FIG. 5 is a diagram illustrating an example of grouping pixels in a method of compensating for degeneration of an electroluminescent display device according to some example embodiments.

FIG. 5 is a diagram illustrating an example of grouping pixels in a method of compensating for degeneration of an electroluminescent display device according to some example embodiments.

Referring to FIG. 5, pixels PX in a display panel may be grouped into a plurality of pixel groups PB11~PBps arranged in a plurality of block rows (e.g., blocks of rows) BR1~BRp and a plurality of block columns (e.g., blocks of columns) BC1~BCs by dividing the pixels PX in the display panel using initial block boundaries RBB and CBB, but the example embodiments are not limited thereto. The block rows BR1~BRp may be divided by row boundaries RGB and the block columns BC1~BCs may be divided by column boundaries CGB, but the example embodiments are not limited thereto. Each of the plurality of pixel blocks PB11~PBps may be divided (and/or segmented) by the row block boundaries RBB and the column block boundaries CBB. The initial pixel blocks PB11~PBps may include the same number of the pixels PX divided by the initial block boundaries RBB and RCC. For example, each of the pixel groups PB11~PBps may be, for example, an 8*8 block including 64 pixels as illustrated in FIG. 5, but the example embodiments are not limited thereto, and other sizes for the pixel groups may be used.

With the adoption of high-speed displays, such as OLED displays capable of displaying at 120 Hz or greater, in electronic devices (e.g., smartphones, tablets, etc.) increases, the memory capacity requirements for the degeneration compensation increases, and the power necessary increases due to the high-speed display driving of the 120 Hz. In addition, the increase of the resolution of the display panel is causing an increase in the physical size of the display driving integrated circuit.

Accordingly, the display driving integrated circuit of the OLED display device includes a frame memory to store the image data and an embedded SRAM (static random access memory) as a compensation memory to store data for enhancing image quality. The memory capacity of the compensation memory has increased due to various data processing performed by the display driving integrated circuit such as OLED burn-in compensation, hysteresis compensation, and so on. The increase of the memory capacity results in the increase of the size, complexity, and/or the costs of the display driving integrated circuit.

The amount of the stress data may be reduced significantly by accumulating the block average values to store and providing the accumulated block stress values, where each block average value is an average grayscale value of the pixels in each pixel block. When the stress data are provided through such compression based on units of pixel blocks, the boundary of the stressed regions may not be reflected exactly. Thus, errors may occur and the block boundaries between pixel blocks may be visible and/or recognizable by a user and the quality of the displayed image may be degraded when compensating for the degeneration of pixels using the accumulated block stress values. According to some example embodiments, the image quality may be enhanced by updating the block boundaries to exactly reflect the degeneration pattern of the pixels.

Figure 6:
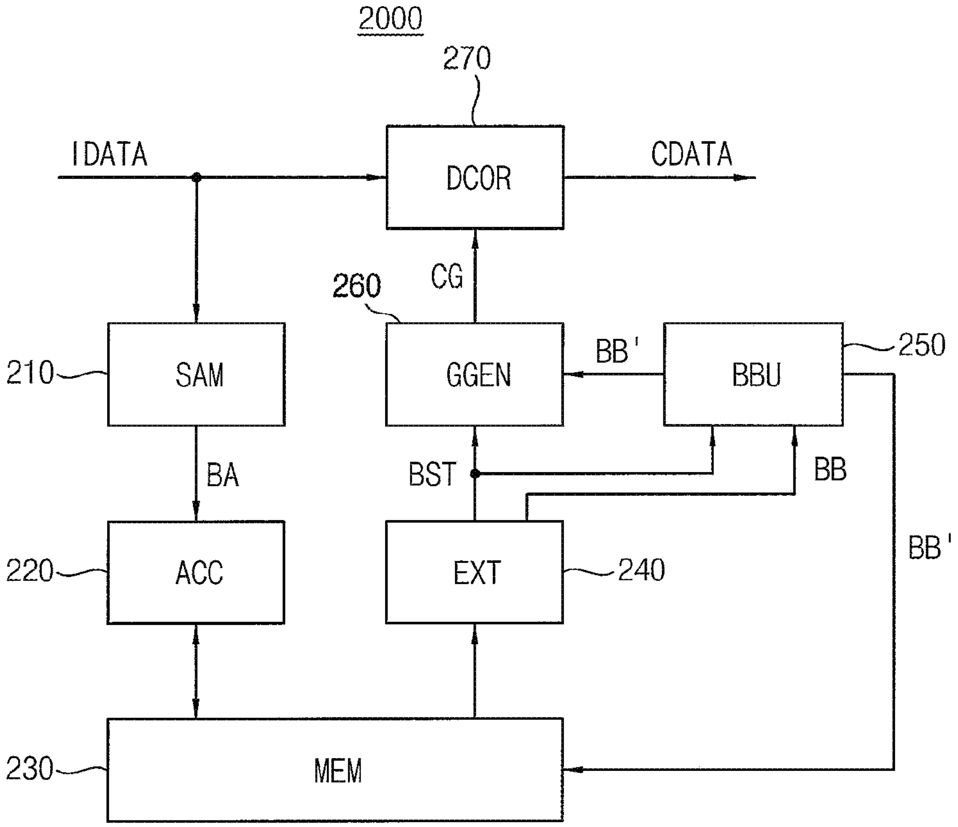
FIG. 6 is a block diagram illustrating an example of a degeneration compensating logic included in an electroluminescent display device according to some example embodiments.

FIG. 6 is a block diagram illustrating an example of a degeneration compensating logic included in an electroluminescent display device according to some example embodiments.

Referring to FIG. 6, a degeneration compensating logic 2000 (e.g., degeneration compensating logic circuitry, etc.) may include a sampling unit SAM 210 (e.g., sampling circuitry, etc.), an accumulating unit ACC 220 (e.g., accumulating circuitry, etc.), a memory unit MEM 230 (e.g., memory circuitry, etc.), an extracting unit 240 (e.g., extracting circuitry, etc.), a boundary updating unit BBU 250 (e.g., boundary circuitry, etc.), a gain generating unit GGEN 260 (e.g., gain generating circuitry, etc.), and/or a data correcting unit DCOR 270 (e.g., data correcting circuitry, etc.), but the example embodiments are not limited thereto. According to some example embodiments, the degeneration compensating logic 2000 may be implemented as processing circuitry capable of performing the functionality of one or more of the sampling unit SAM 210, the accumulating unit ACC 220, the memory unit MEM 230, the extracting unit 240, the boundary updating unit BBU 250, the gain generating unit GGEN 260, and/or the data correcting unit DCOR 270, etc. The processing circuitry may include hardware, such as processors, processor cores, logic circuits, storage devices, etc.; a hardware/software combination such as at least one processor core executing software and/or executing any instruction set, etc.; or a combination thereof. For example, the processing circuitry more specifically may include, but is not limited to, a field programmable gate array (FPGA), a programmable logic unit, an application-specific integrated circuit (ASIC), s System-on-Chip (SoC), etc.

The sampling unit 210 may calculate and provide block average values BA based on input image data IDATA of each frame. Each block average value BA may be an average grayscale value of the pixels in each pixel block. The accumulating unit 220 may accumulate each block average value BA with respect to a plurality of frames to store the accumulated block stress values. The memory unit 230 may include a volatile memory device and/or a nonvolatile memory device as will be described below with reference to FIG. 26.

For example, whenever the input image data IDATA of a new frame is provided to the degeneration compensating logic 200, the accumulating unit 220 may read out the previous accumulated block stress values BST stored in the memory unit 230, add the block average values BA of the new frame to the read values BST, and then store the added values as the new accumulated block stress values BST in the memory unit 230, but is not limited thereto.

The extracting unit 240 may extract the accumulated block stress values BST of the adjacent pixel blocks from the memory unit 230 and provide the extracted values BST to the boundary updating unit 250 and/or the gain generating unit GGEN 260, but is not limited thereto.

The boundary updating unit 250 may perform a boundary updating operation to move (e.g., update, recalculate, etc.) present block boundaries BB to updated block boundaries BB'. According to some example embodiments, the boundary updating unit 250 may perform the boundary updating operation based on the accumulated block stress values BST from the extracting unit 240 and/or based on compensation gains CG from the gain generating unit 260, but is not limited thereto. Some example embodiments of the boundary updating operation performed by the boundary updating unit 250 will be described below with reference to FIGS. 7 through 24.

The degeneration compensating logic 2000 may store the updated block boundaries BB' in a nonvolatile memory device included in the memory unit 230. After the boundary updating operation, the degeneration compensating logic 2000 may provide the accumulated block stress values BST by accumulating (and/or compressing, etc.) stress values of the plurality of pixels based on the updated block boundaries BB'.

The gain generating unit 260 may generate the compensation gains CG based on the accumulated block stress values corresponding to updated pixel blocks defined by the updated block boundaries BB'. The gain generating unit 260 may generate the compensation gains CG by the downward compensation scheme or the upward compensation scheme as described with reference to FIGS. 3 and 4, but is not limited thereto.

The data correcting unit 270 may correct the input image data IDATA based on the compensation gains CG to provide the corrected input image data CDATA. In some example embodiments, the data correcting unit 270 may perform interpolation on the compensation gains CG corresponding to the updated pixel blocks to applied the interpolated gains to the input image data IDATA by unit of pixels, but the example embodiments are not limited thereto.

Figure 7:
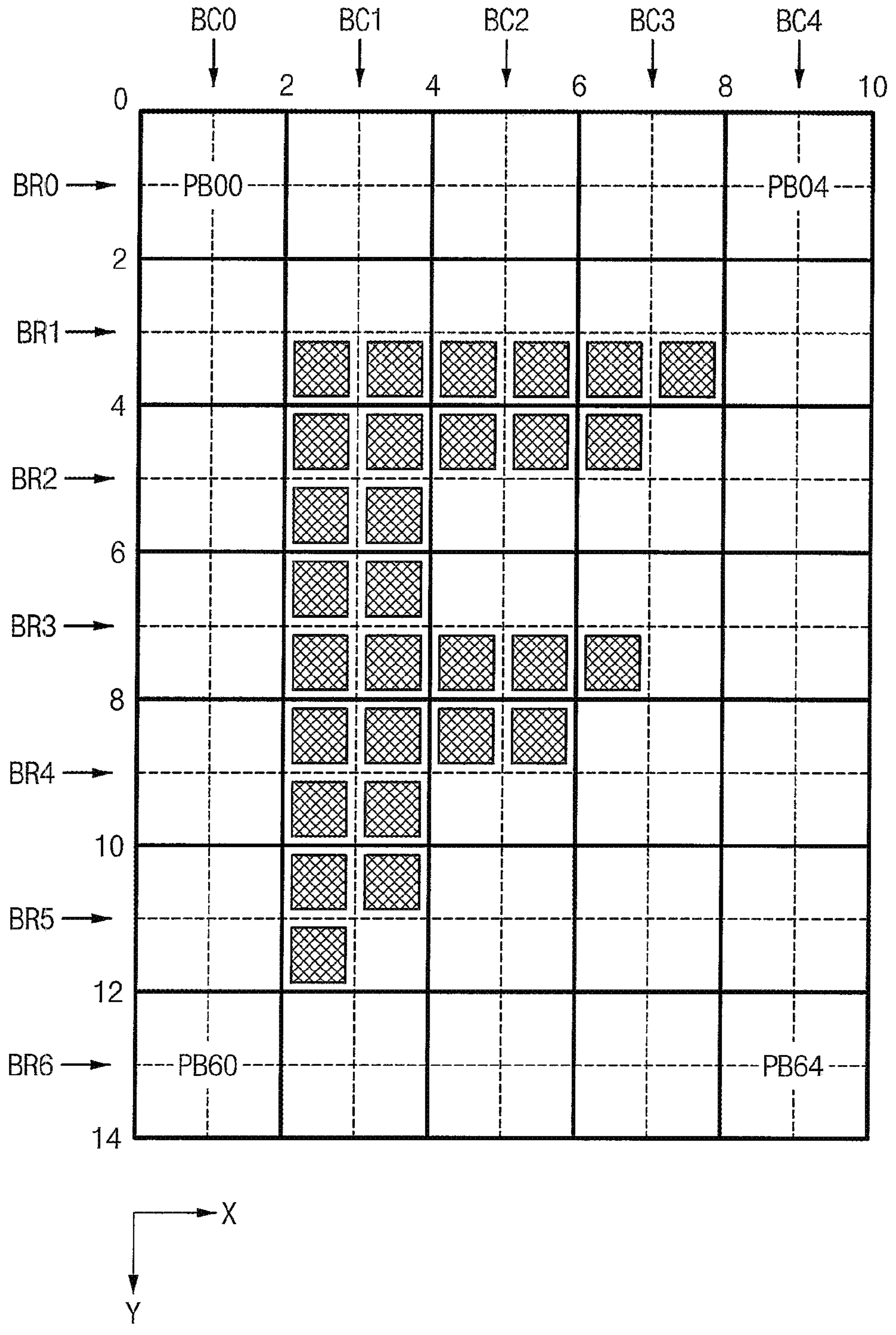
FIG. 7 is a diagram illustrating an example degeneration pattern of a display panel for describing a method of compensating for degeneration of an electroluminescent display device according to some example embodiments.

FIG. 7 is a diagram illustrating an example degeneration pattern of a display panel for describing a method of compensating for degeneration of an electroluminescent display device according to some example embodiments.

In FIG. 7, the bolded lines indicate the initial block boundaries of the thirty five pixel blocks PBij arranged in the seven pixel rows BRi (i=0~6) and the five block columns BCj (j=0~4), and the dotted lines indicate the boundaries of the pixels in the pixel blocks PBij, however the example embodiments are not limited thereto, and other pixel block boundaries may be used. For example, FIG. 7 illustrates that each initial pixel block include the four pixels for convenience of illustration and description, but the number of pixels in the pixel block, the numbers of the block rows and the block columns and the number of the pixel blocks are not limited to the example of FIG. 7.

In addition, FIG. 7 illustrates an example of the degeneration pattern in the display panel according to at least one example embodiment. The hatched rectangles indicate the degenerated pixels and it is assumed that the degeneration degree is equal to all of the degenerated pixels, but the example embodiments are not limited thereto. The degeneration degree may be provided not by pixel units, but by block units as described above, but is not limited thereto. For example, in case of the third block row BR2, the degeneration degrees of the pixel blocks PB20 and PB24 of the first and fifth block columns BC0 and BC4 may be 0, the degeneration degree of the pixel block PB21 of the second block column BC1 may be 1, the degeneration degree of the pixel block PB22 of the third block column BC2 may be 0.5, and the degeneration degree of the pixel block PB23 of the fourth block column BC3 may be 0.25, etc.

FIG. 7 illustrates row coordinates 1~14 and column coordinates 0~10 of the pixel boundaries, but is not limited thereto. The block boundaries may be represented by the row coordinates and the column coordinates, but the example embodiments are not limited thereto. For example, the pixel block PB31 of the fourth block row BR31 and the second block column BC1 may be represented by a start row coordinate of 6 and a start column coordinate 2. Accordingly, updating of boundaries of a pixel block may be considered as updating of a start row coordinate and/or a start column coordinate of the pixel block, but the example embodiments are not limited thereto.

Hereinafter, some example embodiments are described with reference to the initial grouping of the pixels and the degeneration pattern illustrated in FIG. 7 for the sake of brevity and clarity, but the example embodiments are not limited to particular grouping and particular degeneration pattern.

Figure 8:
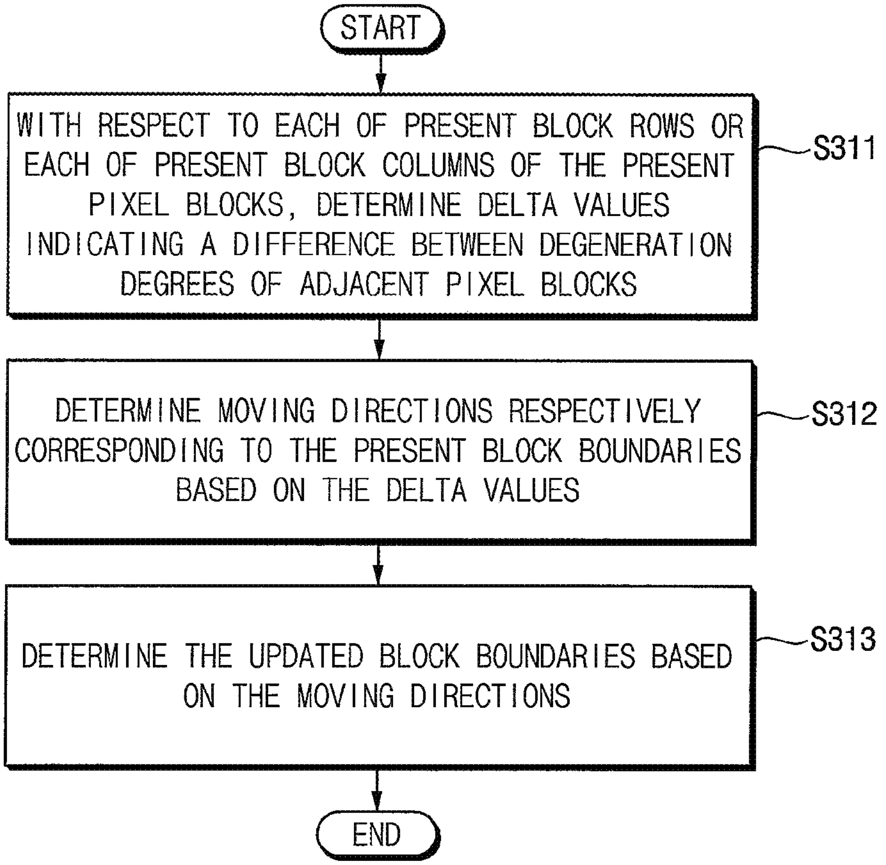
FIG. 8 is a flow chart illustrating an example of a boundary updating operation in a method of compensating for degeneration of an electroluminescent display device according to some example embodiments.

FIG. 8 is a flow chart illustrating an example of a boundary updating operation in a method of compensating for degeneration of an electroluminescent display device according to some example embodiments.

Referring to FIG. 8, in operation S311, the boundary updating unit 250 in FIG. 6 may, with respect to each of present block rows or each of present block columns of the present pixel blocks, determine delta values indicating a difference between degeneration degrees of adjacent pixel blocks.

The degeneration degree D(i,j) may be determined as shown in Expression 1.

$$D(i,j)=SED(BST(i,j)) \quad \text{Expression 1}$$

In Expression 1, i indicates an index of a block row, j indicates an index of a block column, BST(i,j) indicates an accumulated block stress value of a corresponding pixel block PBij and D(i,j) indicates the degeneration degree of the corresponding pixel block PBij. BED( ) indicates a function to convert the accumulated block stress value to the degeneration degree. For example, the function SED( ) may be a linear function or a nonlinear function that converts a desired and/or maximum accumulated block stress value to a value of 1.

In the case of updating the column block boundaries CBB as illustrated in FIG. 5, the delta value ΔD(i,j) may be determined as an absolute value of a difference between the degeneration degrees D(i,j) and D(i,j−1) of the adjacent pixel blocks PBij and PBij−1 in the same block row BRi as shown in Expression 2.

$$\Delta D(i,j)=|D(i,j)-D(i,j-1)| \quad \text{Expression 2}$$

In the case of updating the row block boundaries RBB as illustrated in FIG. 5, the delta value ΔD(i,j) may be determined as an absolute value of a difference between the degeneration degrees D(i,j) and D(i−1,j01) of the adjacent pixel blocks PBij and PBij−1 in the same block column BCj as shown in Expression 3.

$$\Delta D(i,j)=|D(i,j)-D(i-1,j)| \quad \text{Expression 3}$$

In operation S312, the boundary updating unit 250 may determine moving directions respectively corresponding to the present block boundaries based on the delta values, and may determine the updated block boundaries based on the moving directions.

In some example embodiments, normalized delta values may be determined such that each normalized delta value corresponds to a ratio of each delta value with respect to a sum of the delta values, but the example embodiments are not limited thereto.

In the case of updating the column block boundaries CBB, the normalized delta value may be determined as shown in Expression 4.

$$\Delta D\_N(i,j)=\Delta D(i,j)/\Sigma\Delta D(i,k) \quad \text{Expression 4}$$

In Expression 4, Σ indicates a sum of the degeneration degrees with respect to the fixed i value indicating the block row BRi and the k values indicating the pixel blocks PBik included in the block row BRi.

In the case of updating the row block boundaries RBB, the normalized delta value may be determined as shown in Expression 5.

$$\Delta D\_N(i,j)=\Delta D(i,j)/\Sigma\Delta D(k,j) \quad \text{Expression 5}$$

In Expression 5, Σ indicates a sum of the degeneration degrees with respect to the fixed j value indicating the block column BCj and the k values indicating the pixel blocks PBkj included in the block column BCj.

As will be described below with reference to FIGS. 9A through 11B, edge values ECNT(i,j) may be assigned to the present block boundaries based on the normalized delta values ΔD_N(i,j)), and a coordinate sequence SEQ may be determined by arranging present coordinates values SX(i,j)s of the present block boundaries based on the edge values ECNT(i,j). The moving directions MDIR(i,j) may be determined by comparing the present coordinate values SX(i,j)s and values SEQ(i,j) of the coordinate sequence SEQ, etc.

FIGS. 9A through 11B are diagrams illustrating the boundary updating operation of FIG. 8 with respect to one block row in FIG. 7 according to some example embodiments. The process of updating the column block boundaries CBB of the pixel blocks PB20~PB24 in the third block row BR2 in FIG. 7 are described in detail with reference to FIGS. 9A through 11B, but the example embodiments are not limited thereto.

Figure 9B:
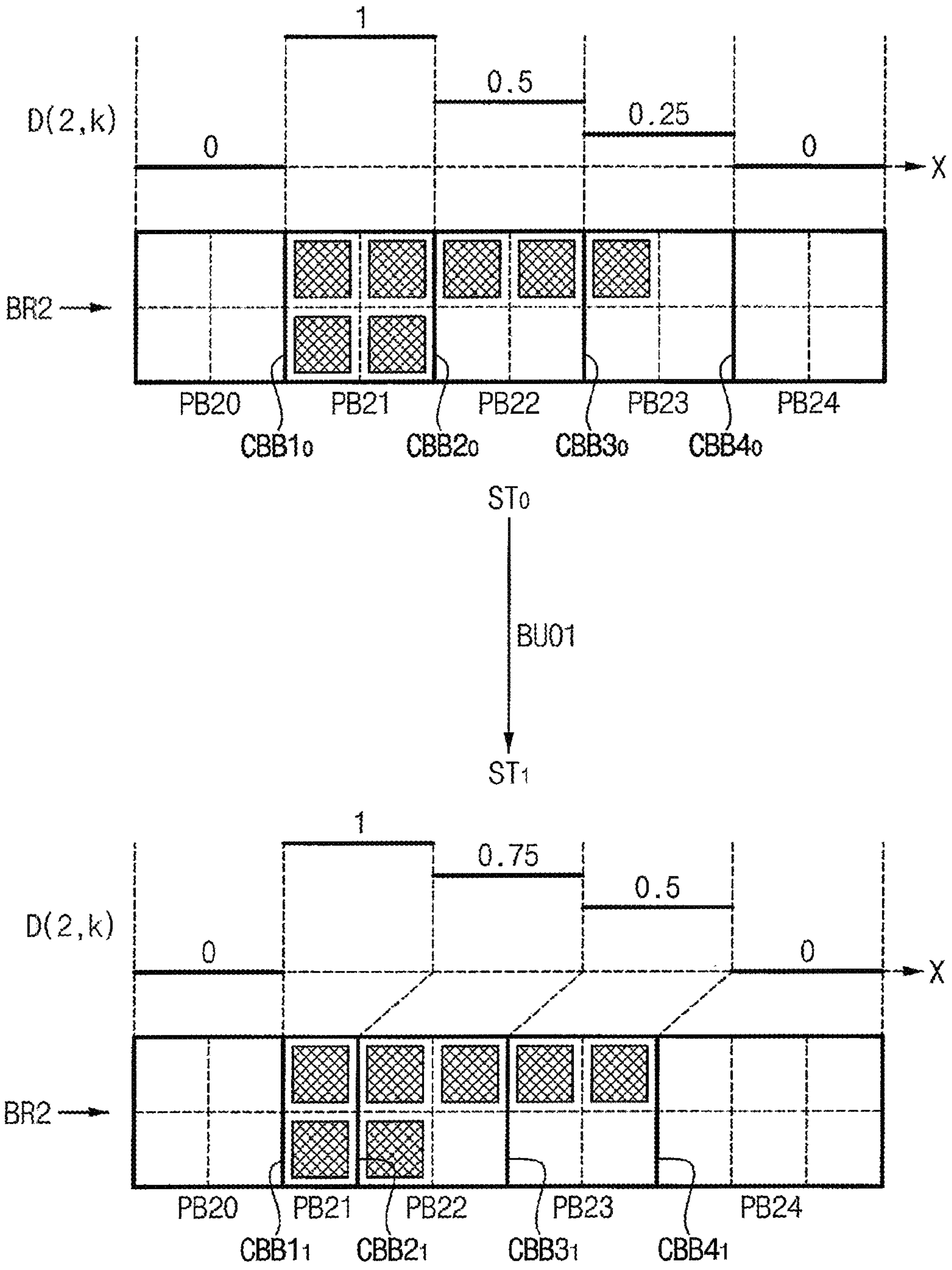

FIGS. 9A and 9B illustrates a first boundary updating operation BUO1 to update column block boundaries $CBB1_0$~$CBB4_0$ of a first state $ST_0$ to column block boundaries $CBB1_1$~$CBB4_1$ of a second state $ST_1$ according to at least one example embodiment. The column block boundaries $CBB1_0$~$CBB4_0$ of the first state $ST_0$ correspond to the present column block boundaries and the column block boundaries $CBB1_1$~$CBB4_1$ of the second state $ST_1$ correspond to the updated column block boundaries, but the example embodiments are not limited thereto. The outermost boundaries may be fixed and may not be updated, but is not limited thereto.

Referring to FIGS. 9A and 9B, the column block boundaries $CBB1_0$~$CBB4_0$ of the first state $ST_0$ may be represented by the start column coordinate values $SX(2,k)_0$ (k=0~4) as described with reference to FIG. 7. In other words, the start column coordinate values $SX(2,k)_0$ of the column block boundaries $CBB1_0$~$CBB4_0$ of the first state $ST_0$ corresponding to the initial block boundaries may be represented as $SX(2,0)_0=0$, $SX(2,1)_0=2$, $SX(2,2)_0=4$, $SX(2,3)_0=6$, and $SX(2,4)_0=8$, but the example embodiments are not limited thereto.

The degeneration degrees D(2,k) (k=0~4) corresponding to the degeneration pattern and/or the degeneration state of the third block row BR2 in FIG. 7 may be determined as D(2,0)=0, D(2,1)=1, D(2,2)=0.5, D(2,3)=0.25 and D(2,4)=0 according to Expression 1, but the example embodiments are not limited thereto.

According to Expression 2, the delta values ΔD(2,k) indicating absolute values of the differences between the adjacent pixel blocks PB2*k* and PB2*k*-1 in the third block row BR2 may be determined as D(2,1)=1, ΔD(2,2)=0.5, ΔD(2,3)=0.25 and ΔD(2,4)=0.25, but the example embodiments are not limited thereto.

The sum of the delta values of the third block row BR2 becomes 2 (=1+0.5+0.25+0.25) and the normalized delta values ΔD_N(2,k) may be determined as ΔD_N(2,1)=0.5, ΔD_N(2,2)=0.25, ΔD_N(2,3)=0.125 and ΔD_N(2,4)=0.125 according to Expression 4, but the example embodiments are not limited thereto.

The edge values ECNT(2,k) may be assigned to the present block boundaries based on the normalized delta values ΔD_N(2,k). For example, the edge values ECNT(2,k) may be determined as ECNT(2,1)=2, ECNT(2,2)=1, ECNT(2,3)=0.5 and ECNT(2,4)=0.5 by multiplying a total edge number (e.g., 4) corresponding to the total number of the variable block boundaries to the normalized delta values ΔD_N(2,k), but the example embodiments are not limited thereto. When the edge value is not an integer, the edge number may be adjusted to an integer properly by rounding off, rounding up, etc. For example, ECNT(2,3) may be adjusted from 0.5 to 1, and ECNT(2,4) may be adjusted from 0.5 to 0, etc.

The coordinate sequence SEQ may be determined by arranging the present coordinates values $SX(2,k)_0$ of the column block boundaries CBB$\mathbf{1}_0$~CBB$\mathbf{4}_0$ of the first state $ST_0$ repeatedly based on the edge values ECNT(2,k). In other words, the values SEQ(2,k) of the coordinate sequence SEQ may be determined such that $SX(2,0)_0=0$ corresponding to the fixed block boundary is arranged once, $SX(2,1)_0=2$ corresponding to ECNT(2,1)=2 is arranged twice, $SX(2,2)_0=4$ corresponding to ECNT(2,2)=1 is arranged once, and $SX(2,3)_0=6$ corresponding to ECNT(2,3)=1 is arranged once, etc. As a result, the values SEQ(2,k) of the coordinate sequence SEQ may be determined as SEQ(2,0)=0, SEQ(2,1)=2, SEQ(2,2)=2, SEQ(2,3)=4 and SEQ(2,4)=6, but the example embodiments are not limited thereto.

The moving directions MDIR(2,k) of the column block boundaries CBB$\mathbf{1}_0$~CBB$\mathbf{4}_0$ of the first state $ST_0$ may be determined by comparing the coordinate values $SX(2,k)_0$ and the values SEQ(2,k) of the coordinate sequence SEQ.

For example, each of the moving directions MDIR(2,k) may be determined as a sign SIGN of each value SEQ(2,k) of the coordinate sequence SEQ subtracted by each coordination value $SX(2,k)_0$ of the first state $ST_0$. As a result, the moving directions MDIR(2,k) may be determined as shown in Expression 6.

$$MDIR(2,1)=\mathrm{SIGN}\{\mathrm{SEQ}(2,1)-SX(2,1)0\})=\mathrm{SIGN}\{2-2\}=(0)$$

$$MDIR(2,2)=\mathrm{SIGN}\{\mathrm{SEQ}(2,2)-SX(2,2)0\}*\mathrm{SIGN}\{2-4\}=(-)$$

$$MDIR(2,3)=\mathrm{SIGN}\{\mathrm{SEQ}(2,3)-SX(2,3)0\})=\mathrm{SIGN}\{4-6\}=(-)$$

$$MDIR(2,4)=\mathrm{SIGN}\{\mathrm{SEQ}(2,4)-SX(2,4)0\}*\mathrm{SIGN}\{6-8\}=(-) \quad \text{Expression 6}$$

The updated block boundaries, that is, the column block boundaries CBB$\mathbf{1}_1$~CBB$\mathbf{4}_1$ of the second state $ST_1$ may be determined based on the moving directions MDIR(2,k) as shown in Expression 6.

In general, the degeneration state of the pixels is not changed rapidly within a short time duration, and thus the moving amount of each block boundary by a single boundary updating operation may be limited to be less than a desired and/or maximum moving amount (e.g., a desired moving amount, etc.). For example, the moving amount of each block boundary by the single boundary updating operation may be fixed as a pixel size. In other words, the coordinate value may be changed at most by one with the single boundary updating operation, but the example embodiments are not limited thereto.

FIGS. 9A and 9B illustrate an example where the coordinate value of the present block boundary is maintained when the corresponding moving direction is (0), the coordinate value of the present block boundary is decreased by 1 when the corresponding moving direction is (−), and the coordinate value of the present block boundary is increased by 1 when the corresponding moving direction is (+), but the example embodiments are not limited thereto. When it is impossible to move the block boundary due to an adjacent block boundary, the block boundary may be maintained without moving the block boundary.

As a result, the column block boundaries CBB11~CBB41 of the second state ST1, which are updated by the first boundary updating operation BUO1, may be determined as $SX(2,0)_1=0$, $SX(2,1)_1=2$, $SX(2,2)_1=3$, $SX(2,3)_1=5$ and $SX(2,4)_1=7$, etc.

Such boundary updating operation may be repeated such that the updated block boundaries approach burn-in boundaries indicating the degeneration pattern of the pixels. For example, after the first boundary updating operation BUO1 as described with reference to FIGS. 9A and 9B, a second boundary updating operation BUO2 of FIGS. 10A and 10B and a third boundary updating operation BUO3, etc., of FIGS. 11A and 11B may be performed sequentially, but the example embodiments are not limited thereto. The timing and number of the repeated boundary updating operations may be determined properly based on the operation characteristics of the display device and the operation environments.

Figure 10B:
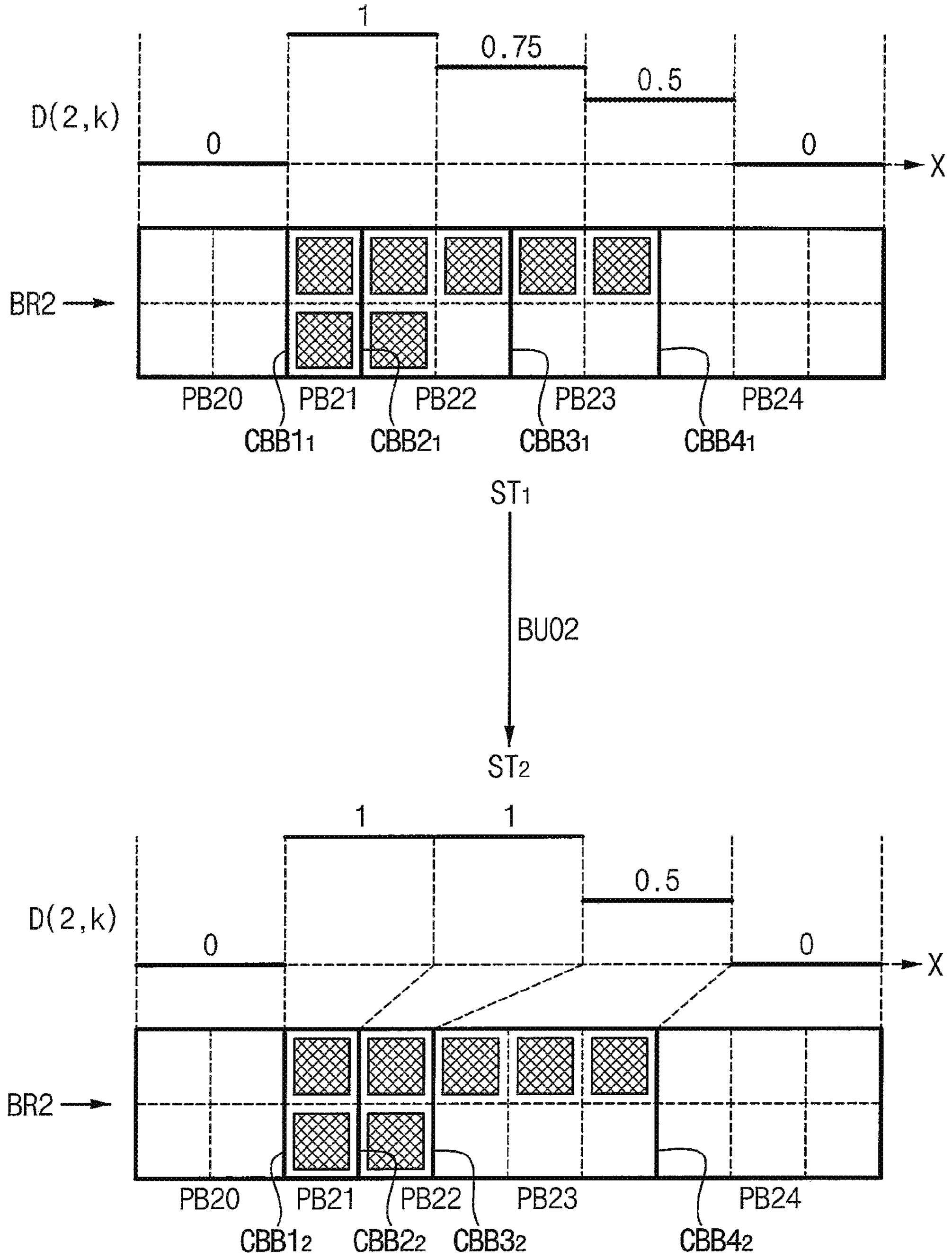
Figure 11B:
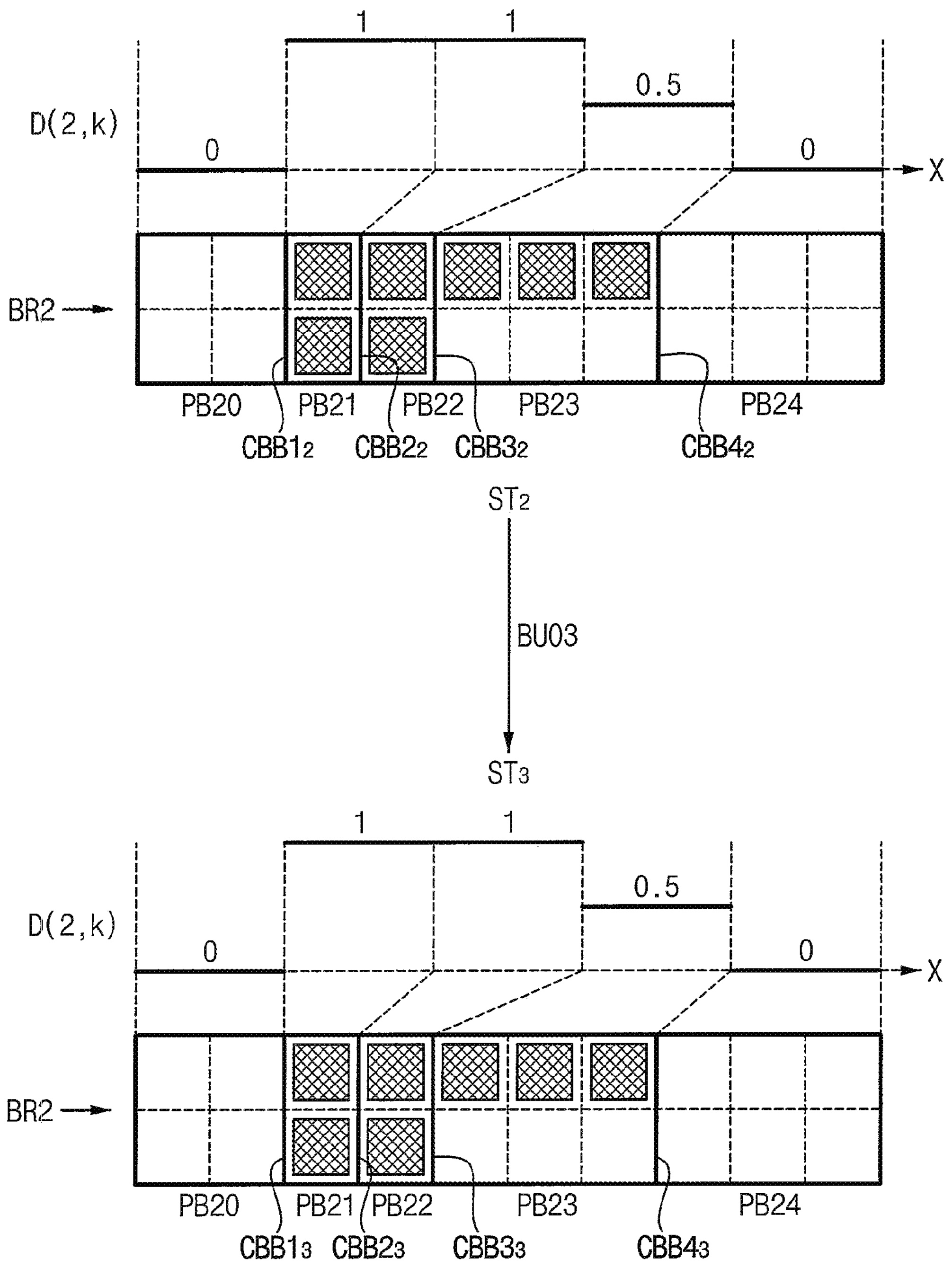

The second boundary updating operation BUO2 of FIGS. 10A and 10B and the third boundary updating operation BUO3 of FIGS. 11A and 11B are similar to the first boundary updating operation BUO1 of FIGS. 9A and 9B. Hereinafter, repeated descriptions are omitted and only the results of the second and third boundary updating operations BUO2 and BUO3 are described.

FIGS. 10A and 10B illustrates the second boundary updating operation BUO2 to update the column block boundaries CBB$\mathbf{1}_1$~CBB$\mathbf{4}_1$ of the second state $ST_1$ to column block boundaries CBB$\mathbf{1}_2$~CBB$\mathbf{4}_2$ of a third state $ST_2$ according to at least one example embodiment. The column block boundaries CBB$\mathbf{1}_1$~CBB$\mathbf{4}_1$ of the second state $ST_1$ correspond to the present column block boundaries and the column block boundaries CBB$\mathbf{1}_2$~CBB$\mathbf{4}_2$ of the third state $ST_2$ correspond to the updated column block boundaries, but the example embodiments are not limited thereto.

Referring to FIGS. 10A and 10B, the coordinate values $SX(2,k)_1$ of the column block boundaries CBB$\mathbf{1}_1$~CBB$\mathbf{4}_1$ of the second state $ST_1$ are $SX(2,0)_1=0$, $SX(2,1)_1=2$, $SX(2,2)_1=4$, $SX(2,3)_1=6$ and $SX(2,4)_1=8$ and the corresponding degeneration degrees D(2,k) are D(2,0)=0, D(2,1)=1, D(2,2)=0.5, D(2,3)=0.25 and D(2,4)=0, but the example embodiments are not limited thereto. The coordinate values $SX(2,k)_2$ of the column block boundaries CBB$\mathbf{1}_2$~CBB$\mathbf{4}_2$ of the third state $ST_2$, which are determined by the same way as described with reference to FIGS. 9A and 9B, are $SX(2,0)_2=0$, $SX(2,1)_2=2$, $SX(2,2)_2=3$, $SX(2,3)_2=4$ and $SX(2,4)_2=7$, but the example embodiments are not limited thereto. The degeneration degrees D(2,k) of the pixel blocks PB20~PB24 defined by the updated column block boundaries CBB$\mathbf{1}_2$~CBB$\mathbf{4}_2$ of the third state $ST_2$ are determined as D(2,0)=0, D(2,1)=1, D(2,2)=1 D(2,3)=0.5 and D(2,4)=0, but the example embodiments are not limited thereto.

FIGS. 11A and 11B illustrates the third boundary updating operation BUO3 to update the column block boundaries $CBB1_2$~$CBB4_2$ of the third state $ST_2$ to column block boundaries $CBB1_3$~$CBB4_3$ of a fourth state $ST_3$ according to at least one example embodiment. The column block boundaries $CBB1_2$~$CBB4_2$ of the third state $ST_2$ correspond to the present column block boundaries and the column block boundaries $CBB1_3$~$CBB4_3$ of the fourth state $ST_2$ correspond to the updated column block boundaries.

Referring to FIGS. 11A and 11B, the coordinate values $SX(2,k)_2$ of the column block boundaries $CBB1_2$~$CBB4_2$ of the third state $ST_2$ are $SX(2,0)_2=0$, $SX(2,1)_2=2$, $SX(2,2)_2=3$, $SX(2,3)_2=4$ and $SX(2,4)_2=7$, and the corresponding degeneration degrees D(2,k) are D(2,0)=0, D(2,1)=1, D(2,2)=1, D(2,3)=0.5 및 D(2,4)=0, but the example embodiments are not limited thereto. The coordinate values $SX(2,k)_3$ of the column block boundaries $CBB1_3$~$CBB4_3$ of the fourth state $ST_3$, which are determined by the same way as described with reference to FIGS. 9A and 9B, are $SX(2,0)_3=0$, $SX(2,1)_3=2$, $SX(2,2)_3=3$, $SX(2,3)_3=4$ and $SX(2,4)_3=7$, but the example embodiments are not limited thereto. The degeneration degrees D(2,k) of the pixel blocks PB20~PB24 defined by the updated column block boundaries $CBB1_3$~$CBB4_3$ of the fourth state $ST_3$ are determined as D(2,0)=0, D(2,1)=1, D(2,2)=1 D(2,3)=0.5 and D(2,4)=0, but the example embodiments are not limited thereto.

As such, the column block boundaries may not be changed by the third boundary updating operation BUO3, and it is understood that the updated block boundaries approach the burn-in boundaries due to the repeated boundary updating operations, but the example embodiments are not limited thereto.

FIGS. 12A through 12E are diagrams illustrating the boundary updating operation with respect to all block rows in FIG. 7 according to at least one example embodiment. The boundary updating operations for respective block rows of FIGS. 12A through 12E are substantially the same as the boundary updating operation for the signal block row of FIGS. 9A through 11B, thus repeated descriptions are omitted and only the results of the boundary updating operations are described.

FIG. 12A illustrates processes of updating the pixel blocks PB00~PB04 included in the first block row BR0 in FIG. 7 according to at least one example embodiment. The degeneration degrees of the seventh block row BR6 are the same as the degeneration degrees of the first block row BR0, and the results of the boundary updating operation of the seventh block row BR6 are the same as the results of the boundary updating operation of the first block row BR0, but the example embodiments are not limited thereto. Referring to FIG. 12A, even though a first boundary updating operation BUO1 is performed, the column coordinate values $SX(0,k)_1$ (e.g., 0, 2, 4, 6 and 8) of the column block boundaries of the second state $ST_1$ are the same as the column coordinate values $SX(0,k)_0$ of the column block boundaries of the first state $ST_0$, because the first block row BR0 does not include the degenerated pixels.

FIG. 12B illustrates processes of updating the pixel blocks PB10~PB14 included in the second block row BR1 in FIG. 7 according to at least one example embodiment. Referring to FIG. 12B, the column coordinate values $SX(0,k)_0$ (e.g., 0, 2, 4, 6 and 8) of the column block boundaries of the first state $ST_0$ are updated to the column coordinate values $SX(1,k)_1$ (e.g., 0, 2, 3, 7 and 8) of the column block boundaries of the second state ST1 by the first boundary updating operation BUO1. After that, even though the second boundary updating operation BUO2 is performed, the column coordinate values $SX(1,k)_2$ (e.g., 0, 2, 3, 7 and 8) of the column block boundaries of the third state $ST_2$ are the same as the column coordinate values $SX(1,k)_1$ (e.g., 0, 2, 3, 7 and 8) of the column block boundaries of the second state $ST_1$.

FIG. 12C illustrates processes of updating the pixel blocks PB20~PB24 included in the third block row BR2 in FIG. 7 according to at least one example embodiment. The degeneration degrees of the fourth block row BR3 are the same as the degeneration degrees of the third block row BR2, and the results of the boundary updating operation of the fourth block row BR3 are the same as the results of the boundary updating operation of the third block row BR2, but the example embodiments are not limited thereto. Referring to FIG. 12C, the column coordinate values $SX(2,k)_0$ (e.g., 0, 2, 4, 6 and 8) of the column block boundaries of the first state $ST_0$ are updated to the column coordinate values $SX(2,k)_1$ (e.g., 0, 2, 3, 7 and 8) of the column block boundaries of the second state $ST_1$ by the first boundary updating operation BUO1, and then updated to the column coordinate values $SX(2,k)_2$ (e.g., 0, 2, 3, 4 and 7) of the column block boundaries of the third state $ST_2$ by the second boundary updating operation BUO2. After that, even though the third boundary updating operation BUO3 is performed, the column coordinate values $SX(2,k)_3$ (e.g., 0, 2, 3, 4 and 7) of the column block boundaries of the fourth state $ST_3$ are the same as the column coordinate values $SX(2,k)_2$ (e.g., 0, 2, 3, 4 and 7) of the column block boundaries of the third state $ST_2$.

FIG. 12D illustrates processes of updating the pixel blocks PB40~PB44 included in the fifth block row BR4 in FIG. 7 according to at least one example embodiment. Referring to FIG. 12D, the column coordinate values $SX(4,k)_0$ (e.g., 0, 2, 4, 6 and 8) of the column block boundaries of the first state $ST_0$ are updated to the column coordinate values $SX(4,k)_1$ (e.g., 0, 2, 3, 5 and 7) of the column block boundaries of the second state $ST_1$ by the first boundary updating operation BUO1, and updated to the column coordinate values $SX(4,k)_2$ (e.g., 0, 2, 3, 4 and 6) of the column block boundaries of the third state $ST_2$ by the second boundary updating operation BUO2. After that, even though the third boundary updating operation BUO3 is performed, the column coordinate values $SX(4,k)_3$ (e.g., 0, 2, 3, 4 and 6) of the column block boundaries of the fourth state $ST_3$ are the same as the column coordinate values $SX(4,k)_2$ (e.g., 0, 2, 3, 4 and 6) of the column block boundaries of the third state $ST_2$.

FIG. 12E illustrates processes of updating the pixel blocks PB50~PB54 included in the sixth block row BR5 in FIG. 7 according to at least one example embodiment. Referring to FIG. 12E, the column coordinate values $SX(5,k)_0$ (e.g., 0, 2, 4, 6 and 8) of the column block boundaries of the first state $ST_0$ are updated to the column coordinate values $SX(4,k)_1$ (e.g., 0, 2, 3, 5 and 7) of the column block boundaries of the second state $ST_1$ by the first boundary updating operation BUO1, updated to the column coordinate values $SX(5,k)_2$ (e.g., 0, 2, 3, 4 and 6) of the column block boundaries of the third state $ST_2$ by the second boundary updating operation BUO2, and then updated to the column coordinate values $SX(5,k)_3$ (e.g., 0, 2, 3, 4 and 5) of the column block boundaries of the fourth state $ST_3$ by the third boundary updating operation BUO3. After that, even though the fourth boundary updating operation BUO4 is performed, the column coordinate values $SX(5,k)_4$ (e.g., 0, 2, 3, 4 and 5) of the column block boundaries of the fifth state $ST_4$ are the same as the column coordinate values $SX(5,k)_{23}$ (e.g., 0, 2, 3, 4 and 5) of the column block boundaries of the fourth state $ST_3$.

Figure 13:
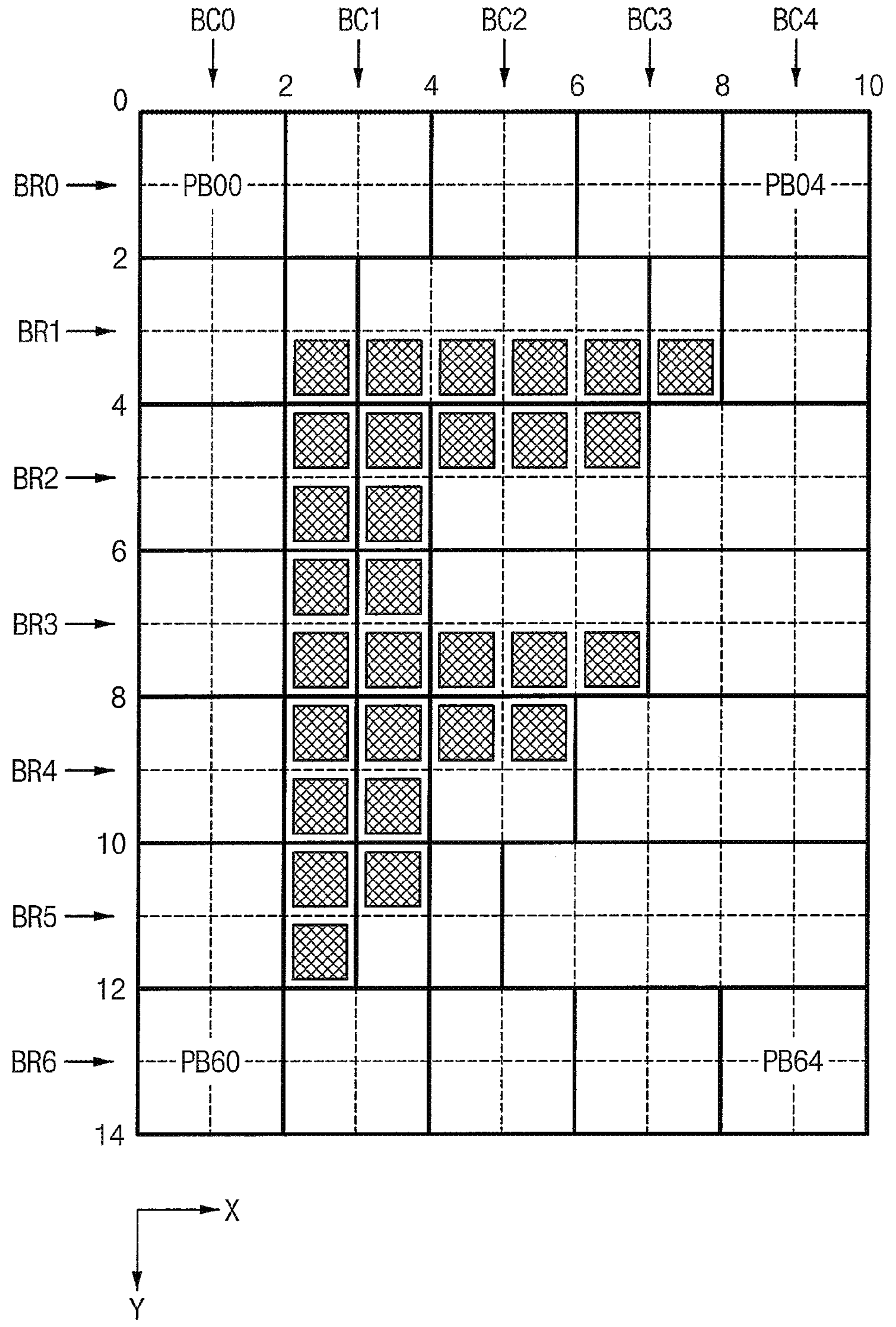
FIG. 13 is a diagram illustrating updated block boundaries by the boundary updating operation of FIGS. 12A through 12E according to some example embodiments.

FIG. 13 is a diagram illustrating updated block boundaries by the boundary updating operation of FIGS. 12A through 12E according to at least one example embodiment.

As illustrated in FIG. 13, the present block boundaries may be moved to the updated block boundaries such that the updated block boundaries are more concentrated in a region of the display panel in which a difference between the degeneration degrees of adjacent pixel blocks is greater, but the example embodiments are not limited thereto. In other words, the present block boundaries may be moved to the updated block boundaries such that the updated block boundaries may be concentrated and/or more compact near burn-in boundaries indicating a degeneration pattern of the plurality of pixels, etc., but the example embodiments are not limited thereto. The boundary updating operation described with reference to FIGS. 8 through 13 may be referred to as a boundary updating operation based on burn-in boundary detection.

As described with reference to FIGS. 9A through 13, with respect to each of the present block rows, the column block boundaries of the pixel blocks included in each present block row may be updated based on the distribution of the accumulated block stress values of the pixel blocks included in each present block row according to some example embodiments. To reduce the complexity of the boundary updating operation, the row boundaries between the block rows may be fixed, and the boundary updating operation by units of block rows may be performed to update the column block boundaries between the pixel blocks in the same block row, but the example embodiments are not limited thereto.

Hereinafter, the boundary updating operation by units of block columns are described with reference to FIGS. 14, 15 and 16. To reduce the complexity of the boundary updating operation, the column boundaries between the block columns may be fixed, and the boundary updating operation by units of block columns may be performed to update the row block boundaries between the pixel blocks in the same block column, but the example embodiments are not limited thereto.

Figure 15:
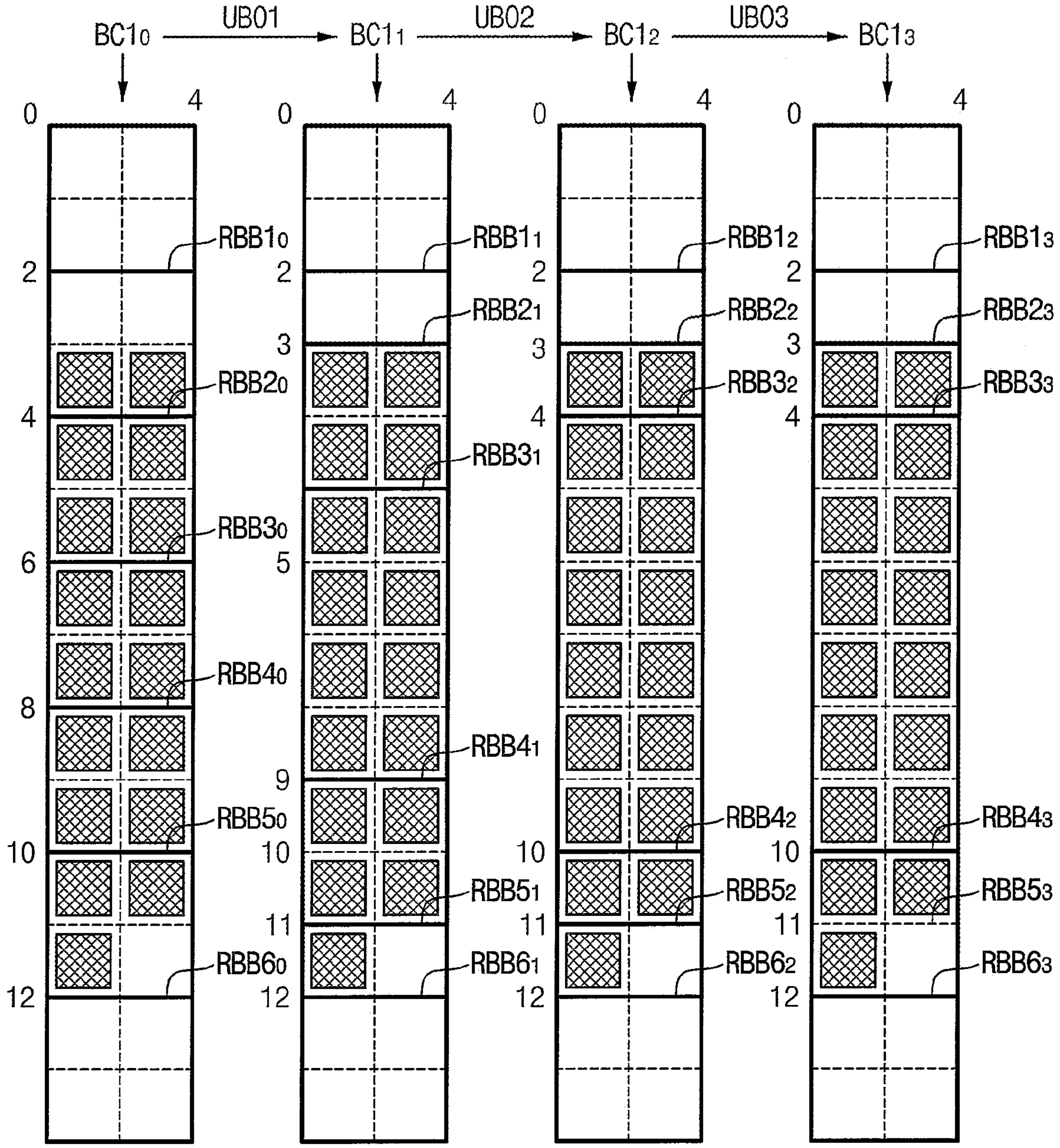

FIGS. 14 and 15 are diagrams illustrating the boundary updating operation of FIG. 8 with respect to one block row in FIG. 7 according to some example embodiments.

As an example, the process of updating the row block boundaries RBB of the plurality of pixel blocks PB01~PB61 in the second block column BC1 in FIG. 7 are described with reference to FIGS. 14 and 15, but are not limited thereto. FIGS. 14 and 15 illustrate a first boundary updating operation BUO1 to update row block boundaries $RBB1_0$~$RBB6_0$ of a first state $ST_0$ to row block boundaries $RBB1_1$~$RBB6_1$ of a second state $ST_1$, a second boundary updating operation BUO2 to update the row block boundaries $RBB1_1$~$RBB6_1$ of the second state $ST_1$ to row block boundaries $RBB1_2$~$RBB6_2$ of a third state $ST_2$, and a third boundary updating operation BUO3 to update the row block boundaries $RBB1_2$~$RBB6_2$ of the third state $ST_2$ to row block boundaries $RBB1_3$~$RBB6_3$ of a fourth state $ST_3$, but the example embodiments are not limited thereto.

The boundary updating operations BUO1~BUO3 are substantially the same as the boundary updating operation for the signal block row of FIGS. 9A through 11B, thus repeated descriptions are omitted and only the results of the boundary updating operations are described. Expression 3 and Expression 5 may be applied to the boundary updating operation by units of block columns of FIGS. 14 and 15, whereas Expression 2 and Expression 4 may be applied to the boundary updating operation by units of block rows of FIGS. 9A through 11B, but the example embodiments are not limited thereto.

Referring to FIGS. 14 and 15, the row coordinate values $SX(k,1)_0$ (k=0~6) (e.g., 0, 2, 4, 6, 8, 10, 12) of the row block boundaries of the first state $ST_0$ may be updated to the row coordinate values $SX(k,1)_1$ (e.g., 0, 2, 3, 5, 9, 11, 12) of the row block boundaries of the second state $ST_1$ the by the first boundary updating operation BOU1, and then updated to the row coordinate values $SX(k,1)_2$ (e.g., 0, 2, 3, 4, 10, 11, 12) of the row block boundaries of the third state $ST_2$, but are not limited thereto. After that, even though the third boundary updating operation BUO3 is performed, the row coordinate values $SX(k,1)_3$ (e.g., 0, 2, 3, 4, 10, 11, 12) of the row block boundaries of the fourth state $ST_3$ are the same as the row coordinate values $SX(k,1)_2$ (e.g., 0, 2, 3, 4, 10, 11, 12) of the row block boundaries of the third state $ST_2$, etc.

As such, the column block boundaries may not be changed by the third boundary updating operation BUO3, and it is understood that the updated block boundaries approach the burn-in boundaries by the repeated boundary updating operations.

Figure 16:
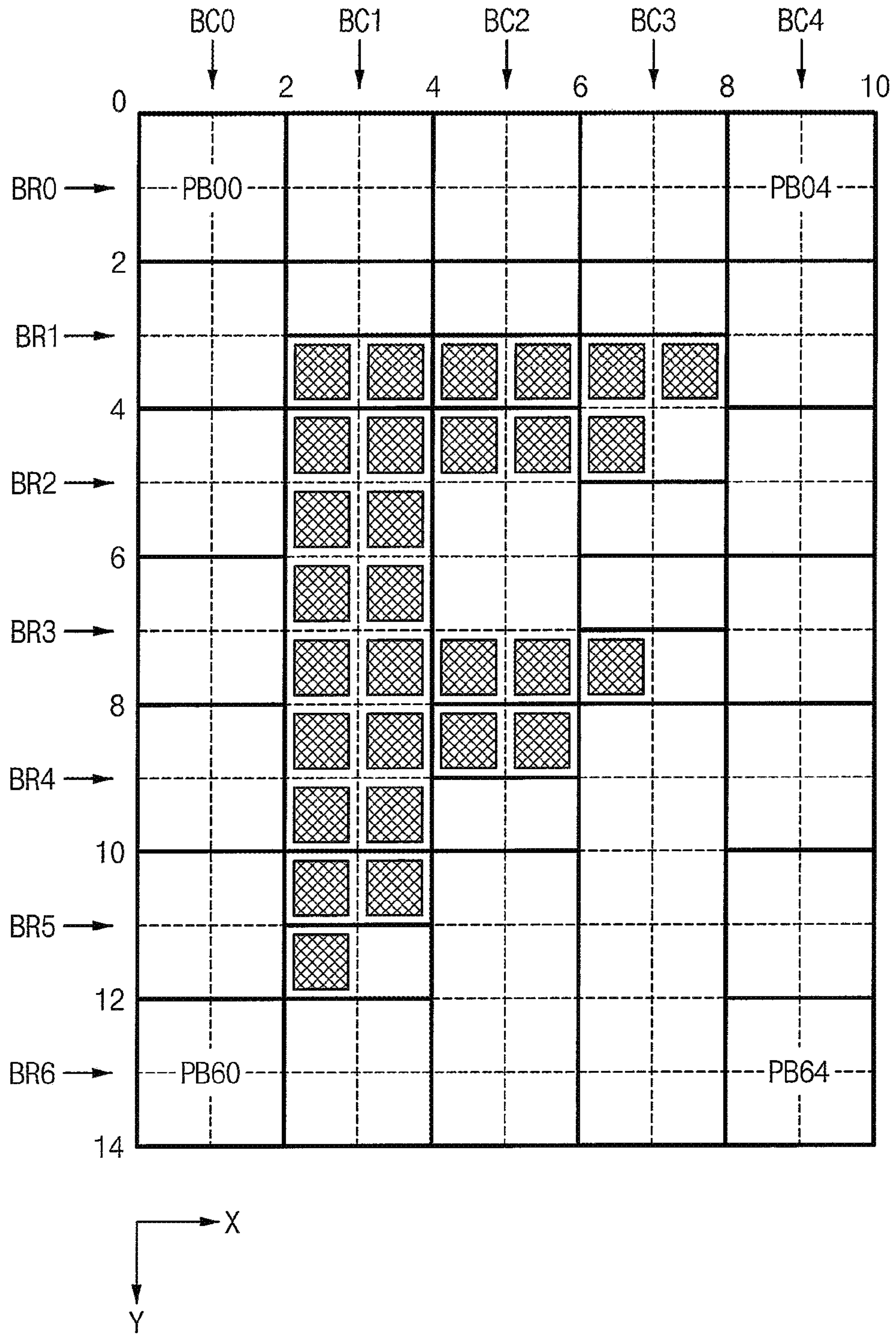
FIG. 16 is a diagram illustrating updated block boundaries by the boundary updating operation of FIGS. 14 and 15 according to some example embodiments.

FIG. 16 is a diagram illustrating updated block boundaries by the boundary updating operation of FIGS. 14 and 15 according to at least one example embodiment.

FIG. 16 illustrates all of the updated row block boundaries that are determined by repeatedly performing the boundary updating operation as described with reference to FIGS. 14 and 15 with respect to each of the block columns BC0~BC4 in FIG. 7.

As illustrated in FIG. 16, the present block boundaries may be moved (e.g., changed, etc.) to the updated block boundaries such that the updated block boundaries are more concentrated in a region of the display panel in which a difference between degeneration degrees of adjacent pixel blocks is greater. In other words, the present block boundaries may be moved to the updated block boundaries such that the updated block boundaries may be concentrated and/or compact near burn-in boundaries indicating a degeneration pattern of the plurality of pixels.

As described with reference to FIGS. 14, 15 and 16, with respect to each of the present block columns, the row block boundaries of the pixel blocks included in each present block column may be updated based on the distribution of the accumulated block stress values of the pixel blocks included in each present block column, but the example embodiments are not limited thereto.

Figure 17:
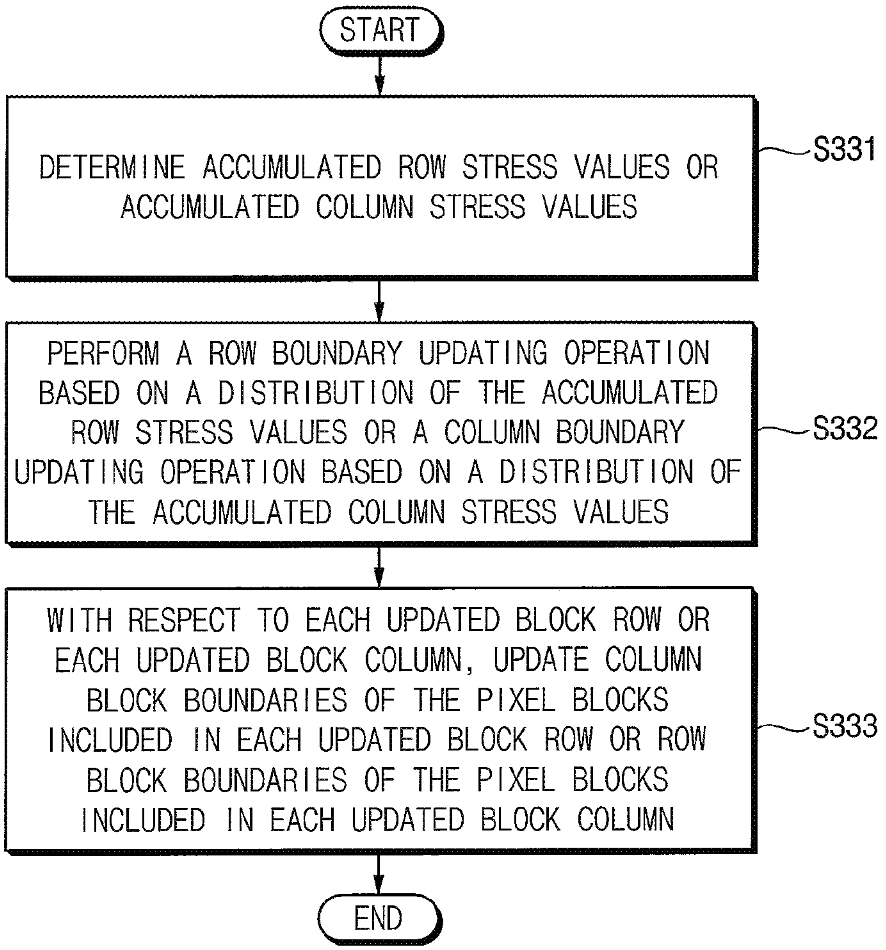
FIG. 17 is a flow chart illustrating an example of a boundary updating operation in a method of compensating for degeneration of an electroluminescent display device according to some example embodiments.

FIG. 17 is a flow chart illustrating an example of a boundary updating operation in a method of compensating for degeneration of an electroluminescent display device according to some example embodiments.

Referring to FIG. 17, in operation S331, a degeneration compensating logic 2000 may determine accumulated row stress values and/or accumulated column stress values. Each accumulated row stress value corresponds to a sum of the accumulated block stress values of the pixel blocks included in each of present block rows, and each accumulated column stress value corresponds to a sum of the accumulated block stress values of the pixel blocks included in each of present block columns.

In operation S332, a row boundary updating operation may be performed by the degeneration compensating logic 2000 based on a distribution of the accumulated row stress values and/or a column boundary updating operation may be performed based on a distribution of the accumulated column stress values. The row boundary updating operation may move present row boundaries of the present block rows to updated row boundaries defining updated block rows, and the column boundary updating operation may move present column boundaries of the present block columns to updated column boundaries defining updated block columns.

With respect to each updated block row or each updated block column, in operation S333, column block boundaries of the pixel blocks included in each updated block row and/or row block boundaries of the pixel blocks included in each updated block column may be updated by the degeneration compensating logic 2000.

In some example embodiments, as will be described below with reference to FIGS. 18 through 20, the row boundary updating operation may be performed first and then, with respect to each updated block row, the column block boundaries of the pixel blocks included in each updated block row may be updated based on a distribution of the accumulated block stress values of the pixel blocks included in each updated block row, but the example embodiments are not limited thereto.

In some example embodiments, even though not illustrated in the figures, the column boundary updating operation may be performed first and then, with respect to each updated block column, the row block boundaries of the pixel blocks included in each updated block column may be updated based on a distribution of the accumulated block stress values of the pixel blocks included in each updated block column, etc.

Figure 18:
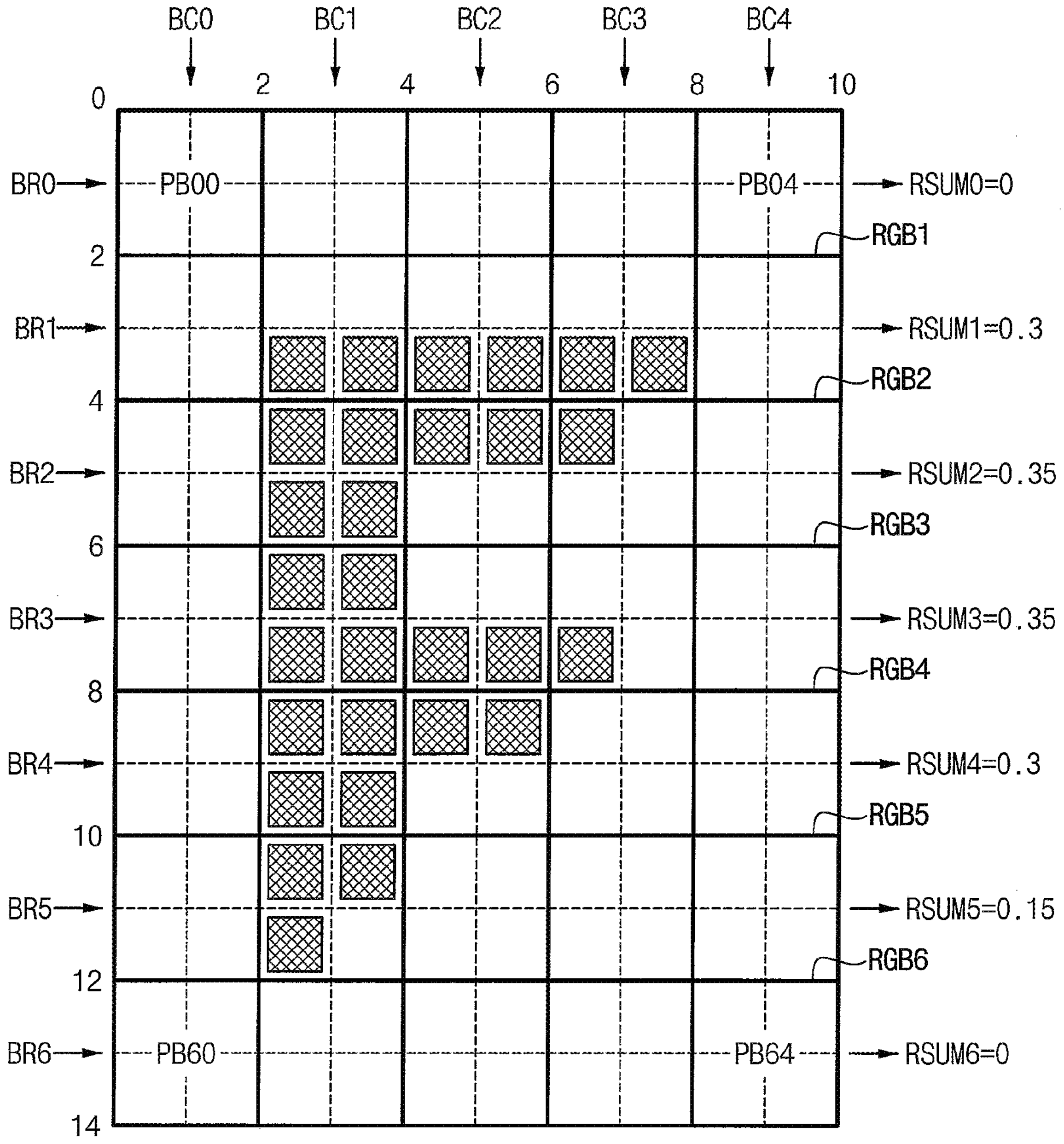
FIGS. 18, 19 and 20 are diagrams for describing the boundary updating operation of FIG. 17 according to some example embodiments.
Figure 19:
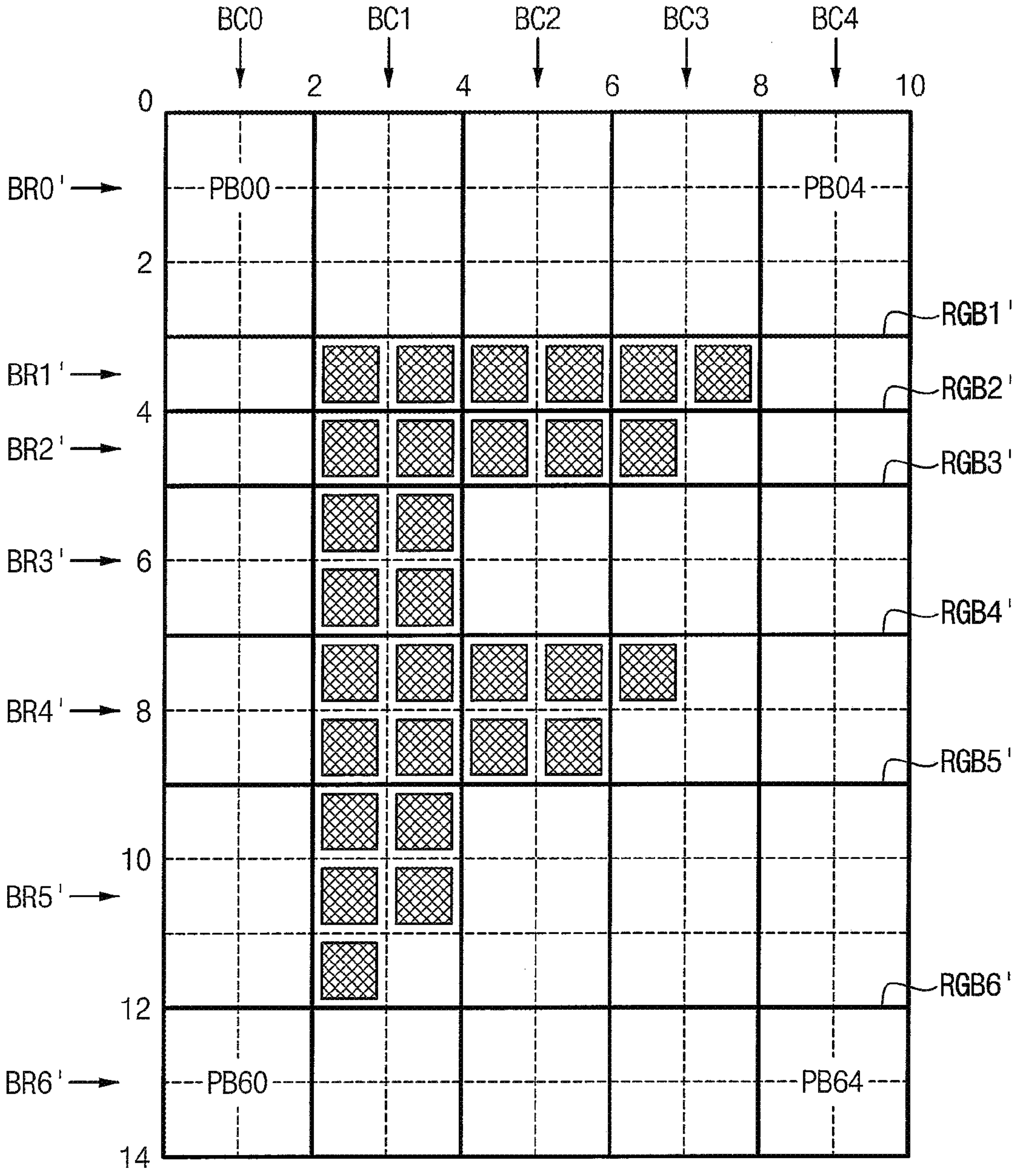
Figure 20:
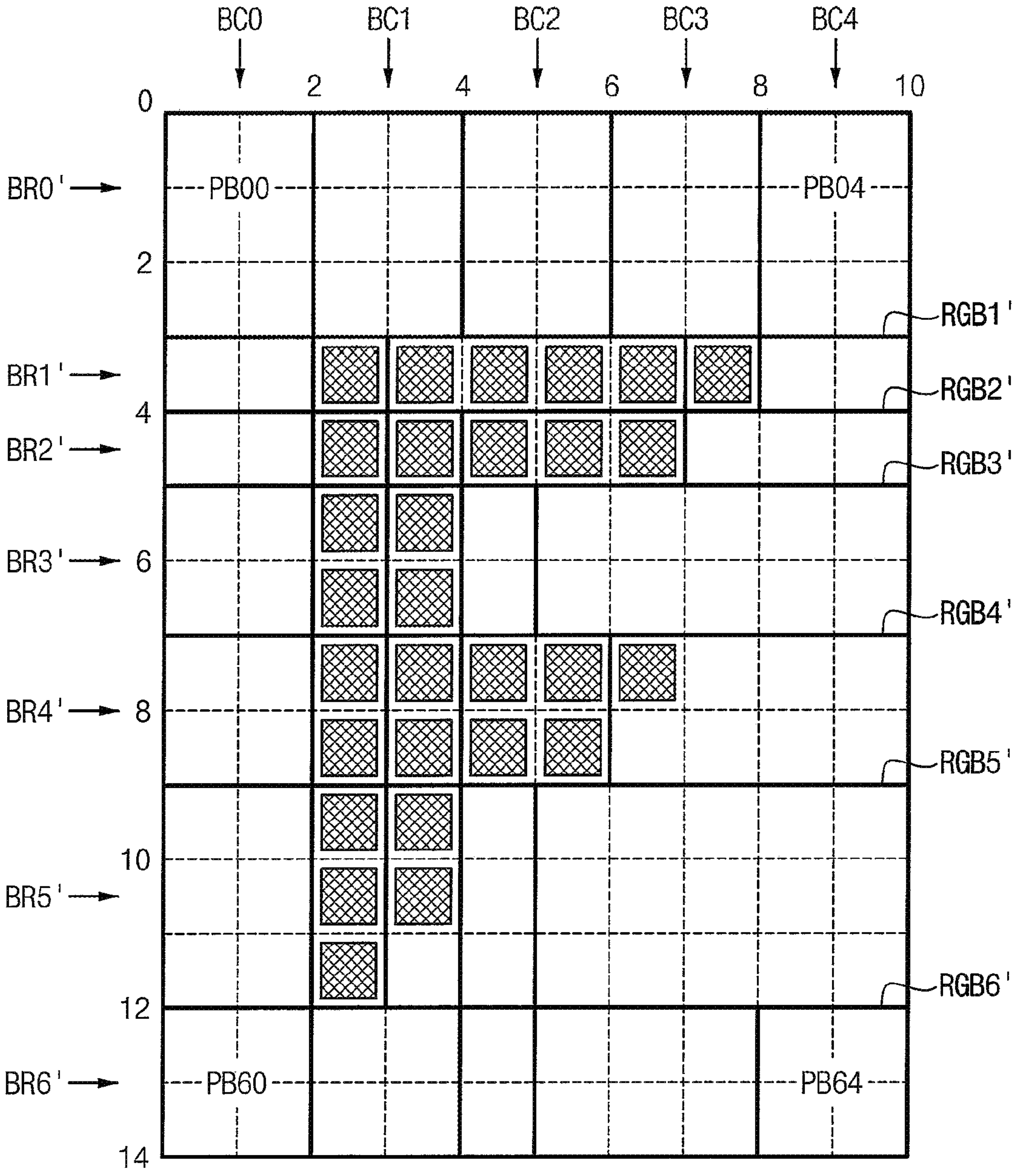

FIGS. 18, 19 and 20 are diagrams for describing the boundary updating operation of FIG. 17 according to at least one example embodiment. FIG. 18 illustrates the same initial grouping of the pixels and the same degeneration pattern as those of FIG. 7 for the sake of brevity and clarity, but the example embodiments are not limited thereto. Descriptions repeated with FIG. 7 are omitted.

Referring to FIG. 18, the accumulated row stress values RSUM0~RSUM7 may be determined by the degeneration compensating logic 2000 such that each accumulated row stress value corresponds to a sum of the accumulated block stress values of the pixel blocks included in each of present block rows BR0~BR6. In other words, the accumulated row stress values RSUM0~RSUM7 may be determined as, for example, 1, 0.3, 0.35, 0.3, 0.15 and 0, respectively, but are not limited thereto. The row boundary updating operation may be performed based on a distribution of the accumulated row stress values RSUM0~RSUM7 to move present row boundaries RGB1~RGB6 of the present block rows to the updated row boundaries RGB1'~RGB6' defining updated block rows, but are not limited thereto.

With respect to each of the updated block rows BR0'~BR6' defined by the updated row boundaries RGB1'~RGB6', the column block boundaries of the pixel blocks PBik (i=0~6, k=0~4) included in each updated block row BRi' may be based on a distribution of the accumulated block stress values of the pixel blocks PBik included in each updated block row BRi', but are not limited thereto. FIG. 20 illustrate the updated column block boundaries of the pixel blocks PBik included in each updated block row BRi' by the boundary updating operation based on burn-in boundary detection as described with reference to FIGS. 8 through 18, but the example embodiments are not limited thereto.

As such, the performance of the degeneration compensation may be further enhanced by performing the row boundary updating operation first and then, with respect to each updated block row, updating the column block boundaries of the pixel blocks included in each updated block row based on a distribution of the accumulated block stress values of the pixel blocks included in each updated block row, but the example embodiments are not limited thereto.

Figure 21:
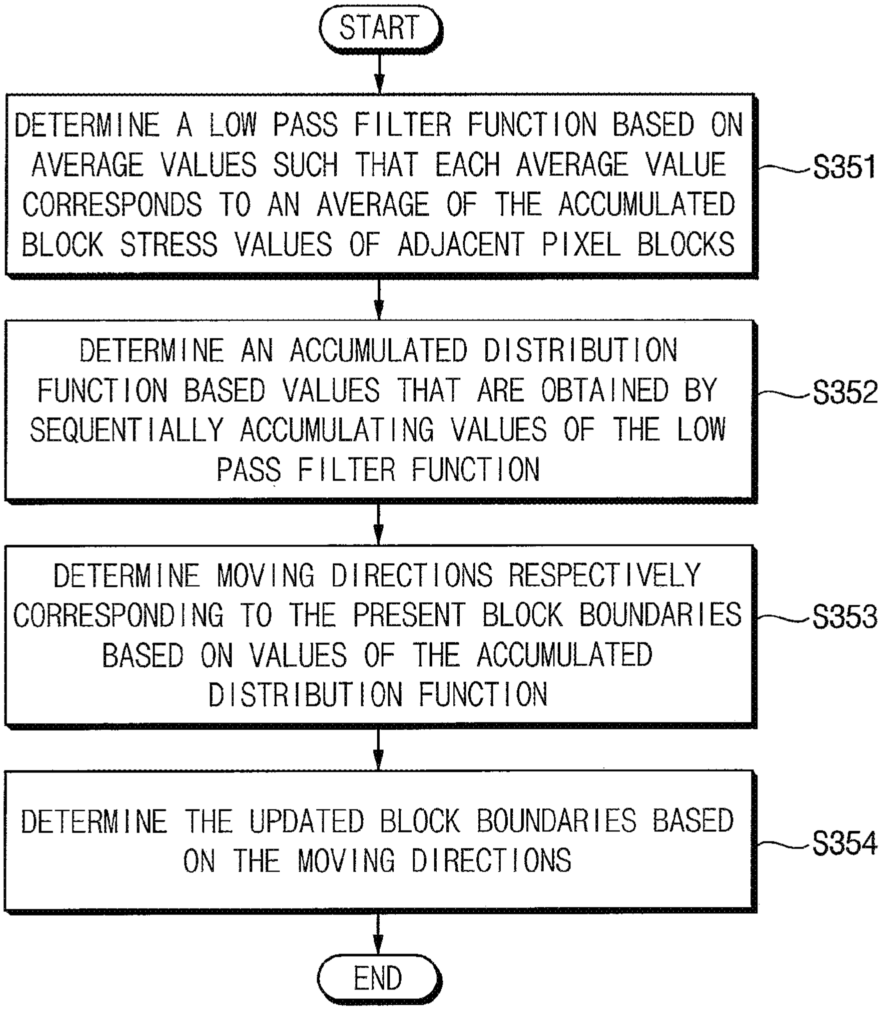
FIG. 21 is a flow chart illustrating an example of a boundary updating operation in a method of compensating for degeneration of an electroluminescent display device according to some example embodiments.

FIG. 21 is a flow chart illustrating an example of a boundary updating operation in a method of compensating for degeneration of an electroluminescent display device according to some example embodiments.

Referring to FIG. 21, in operation S351, a low pass filter function may be determined by the degeneration compensating logic 2000 based on average values such that each average value corresponds to an average of the accumulated block stress values of adjacent pixel blocks. In operation S352, an accumulated distribution function may be determined by the degeneration compensating logic 2000 based values that are obtained by sequentially accumulating values of the low pass filter function. In operation S353, moving directions respectively corresponding to the present block boundaries may be determined by the degeneration compensating logic 2000 based on values of the accumulated distribution function. In operation S354, the updated block boundaries may be determined by the degeneration compensating logic 2000 based on the moving directions.

Figure 22:
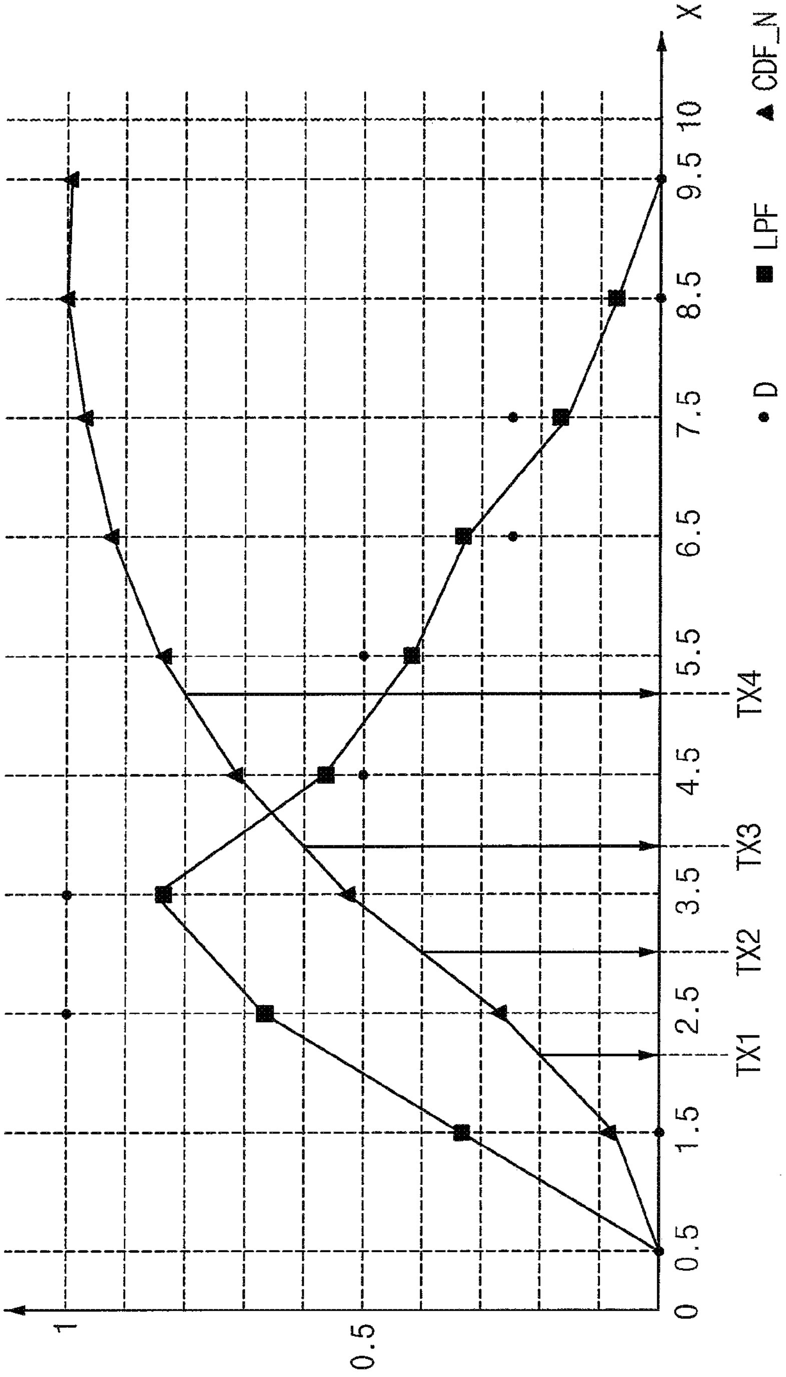
Figure 24:
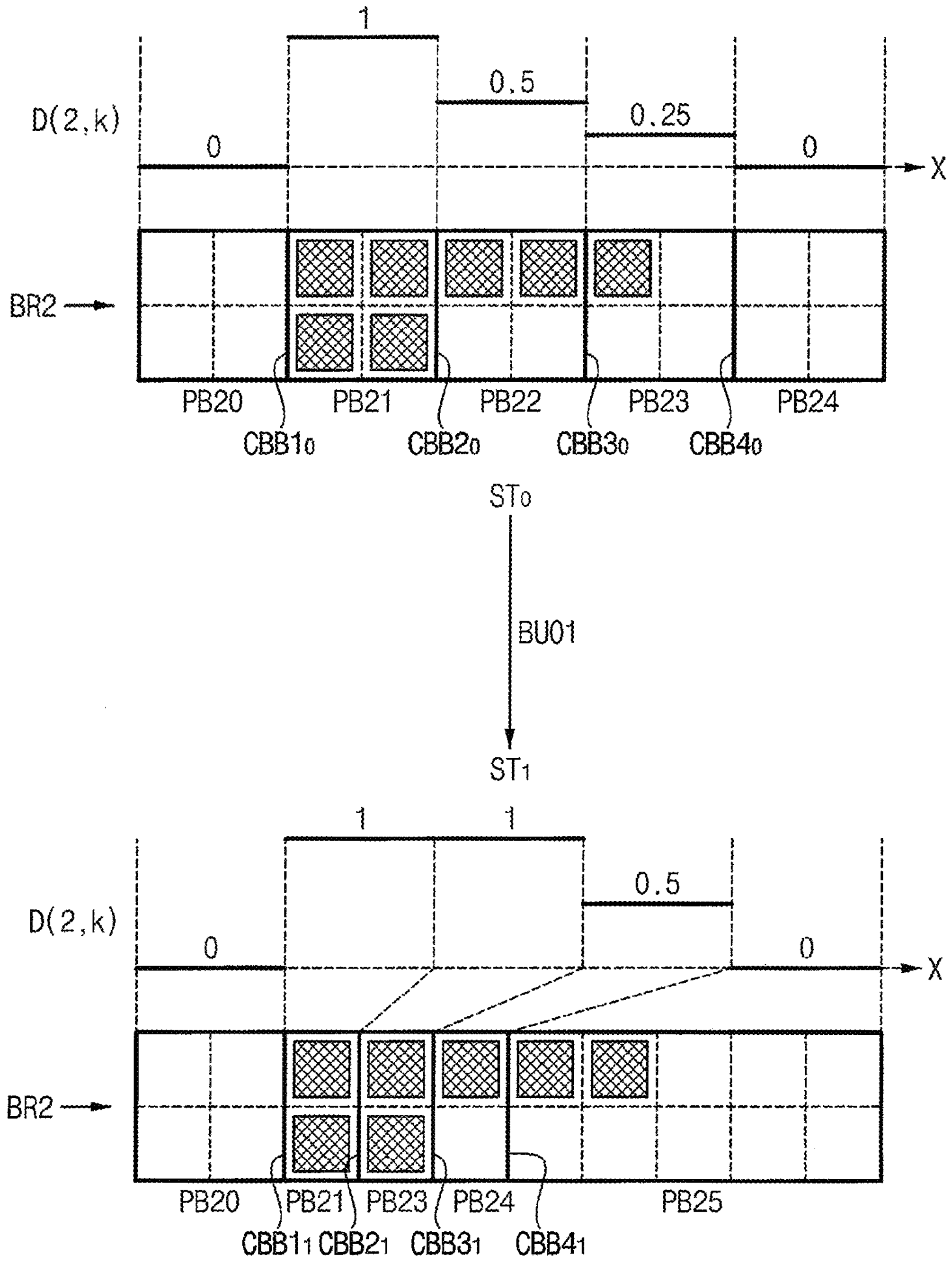

FIGS. 22, 23 and 24 are diagrams illustrating the boundary updating operation of FIG. 21 with respect to one block row in FIG. 7 according to at least one example embodiment.

FIGS. 22 and 23 illustrate values of a degeneration degree function D corresponding to the accumulated block stress values with respect to center coordinate values (e.g., 0.5, 1.5, 2.5, 3.5, 4.5, 5.5, 6.5, 7,5, 8.5, and 9.5) of the pixels PX20~PX29 of the pixel blocks PB20~PB24 in the third block row BR2 in FIG. 7, values of the low pass filter function LPF, values of the accumulated distribution function CDF and values of the normalized accumulated distribution function CDF_N, but the example embodiments are not limited thereto. FIGS. 22 and 23 illustrates an example that the low pass filter function LPF provides the average value of the degeneration degrees of the respective three adjacent pixels, but example embodiments are not limited thereto.

Target coordinate values TX1~TX4 corresponding to values that are obtained by uniformly dividing the values of the accumulated distribution function CDF and/or the normalized accumulated distribution function CDF_N. Here, the number of the target coordinate values TX1~TX4 is, e.g., four, that is, the number of the variable block boundaries. The number of the target coordinate values TX1~TX4 corresponds to the total edge number as described with reference to FIGS. 9A and 9B.

The moving directions with respect to the present column block boundaries may be determined by comparing the present coordinate values and the target coordinate values TX1~TX4. FIG. 24 illustrates a process of a first boundary updating operation BUO1 performed by the degeneration compensating logic 2000 to update column block boundaries CBB10~CBB40 of a first state ST0 to column block boundaries CBB11~CBB41 of a second state ST1, etc. The column block boundaries CBB10~CBB40 of the first state ST0 correspond to the present column block boundaries and the column block boundaries CBB11~CBB41 of the second state ST1 correspond to the updated column block boundaries, but the example embodiments are not limited thereto. The outer-most boundaries may be fixed and may not be updated, but are not limited thereto.

As a result, the column block boundaries CBB10~CBB40 (e.g., 2, 4, 6, and 8) of the first state ST0 may be updated to the column block boundaries CBB11~CBB41 (e.g., 2, 3, 4 and 5) of the second state ST1 by the first boundary updating operation BUO1 as illustrated in FIG. 24.

As such, the present block boundaries may be moved (e.g., changed) to the updated block boundaries such that the updated block boundaries are more concentrated in a region of the display panel in which a degeneration degree of is greater. In other words, the present block boundaries may be moved (e.g., changed) to the updated block boundaries such that the updated block boundaries may be concentrated and/or compact in the region of higher degeneration degree, but the example embodiments are not limited thereto. The boundary updating operation described with reference to FIGS. 21 through 24 may be referred to as a boundary updating operation based on burn-in region detection.

FUG. 25 is a block diagram illustrating a display system according to some example embodiments.

Figure 25:
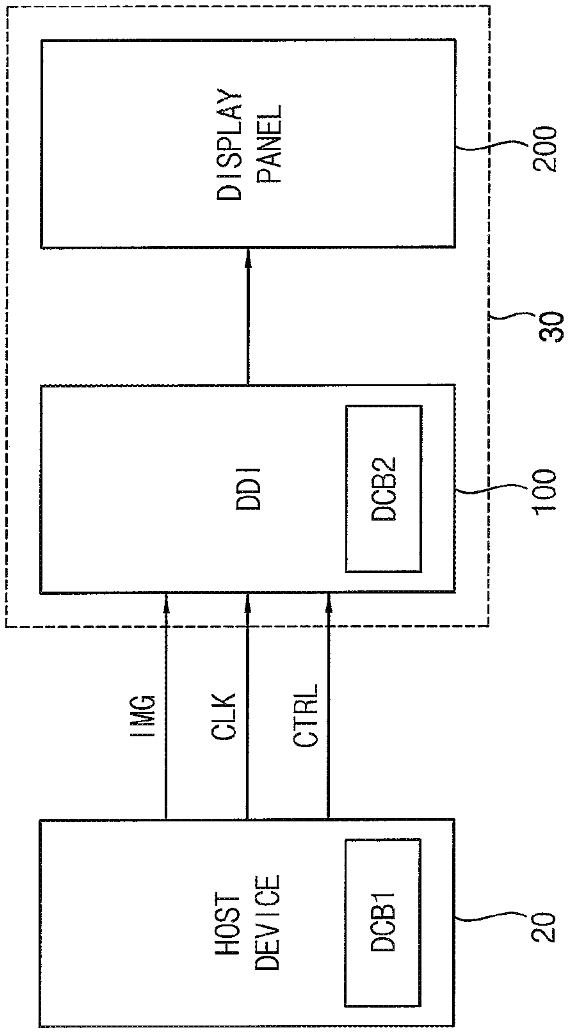

Referring to FIG. 25, the display system 10 may include at least one host processor 20 included in a host device and/or a display device 30, etc., but may have a greater or lesser number of constituent components. The display device 30 may include a display driving integrated circuit DDI 100 and/or a display panel 200, etc. The host processor 20 may be a single processor, a multi-core processor, a plurality of processors, etc., but the example embodiments are not limited thereto.

The host processor 20 may control overall operations of the display system 10. The host processor 20 may be an application processor (AP), a baseband processor (BBP), a micro-processing unit (MPU), and so on. The host processor 20 may provide input image data IMG, a clock signal CLK and/or control signals CTRL, etc., to the display device 200. For example, the input image data IMG may include RGB pixel values and may have a resolution of w*h where w is a number of pixels in a horizontal direction and h is a number of pixels in a vertical direction.

The control signals may include a command signal, a horizontal synchronization signal, a vertical synchronization signal, a data enable signal, etc., but are not limited thereto. For example, the input image data IMG and/or the control signals CTRL may be provided, as a form of a packet, to the display driving integrated circuit 100 in the display device 30. The command signal may include control information to control the display driving integrated circuit 100, image information and/or display setting information, etc. The image information may include, for example, a resolution of the input image data IMG, etc. The display setting information may include, for example, panel information, a luminance setting value, and so on. For example, the host processor 20 may provide, as the display setting information, information according to a user input and/or according to desired and/or predetermined setting values.

The display driving integrated circuit 100 may drive and/or operate the display panel 200 based on the input image data IMG and the control signals CTRL. The display driving integrated circuit 100 may convert the digital input image signal IMG to analog signals, and drive and/or operate the display panel 200 based on the analog signals.

The host processor 20 may include a first degeneration compensating logic DCB1 and the display device 30 may include a second degeneration compensating logic DCB2, but the example embodiments are not limited thereto.

The first degeneration compensating logic DCB1 may group all of the plurality of pixels into a plurality of first pixel blocks and provide first accumulated block stress values based on input image data such that each first accumulated block stress value represents a degeneration degree of the pixels included in each first pixel block, but is not limited thereto.

The second degeneration compensating logic DCB2 may group at least a portion of the plurality of pixels into a plurality of second pixel blocks, and provide second accumulated block stress values based on the input image data such that each second accumulated block stress value represents a degeneration degree of the pixels included in each second pixel block, but is not limited thereto.

According to some example embodiments, the first degeneration compensating logic DCB1 may perform a boundary updating operation based on a distribution of the first accumulated block stress values to move (e.g., change) present block boundaries of the plurality of first pixel blocks to updated block boundaries, as described with reference to FIGS. 1 through 24, but the example embodiments are not limited thereto. In some example embodiments, each of the first degeneration compensating logic DCB1 and the second degeneration compensating logic DCB2 may perform the boundary updating operation as described above.

FIG. 26 is a block diagram illustrating a display system according to some example embodiments. The descriptions repeated with FIG. 25 may be omitted.

Referring to FIG. 26, a display system 11 may include a host device or a display controller 21, and a display device 31, but is not limited thereto. The display device 31 may include a display driving integrated circuit 101 and a display panel DPN 201, etc., but is not limited thereto. According to some example embodiments, a host device may include a display controller, etc., but the example embodiments are not limited thereto.

The display controller 21 may include a first degeneration compensating logic 301, and the display driving integrated circuit 101 of the display device 30 may include a second degeneration compensating logic 302, but the example embodiments are not limited thereto. The basic operations of the first degeneration compensating logic 301 and the second degeneration compensating logic 302 are the same as described with reference to FIG. 6, and the repeated descriptions are omitted, but the example embodiments are not limited thereto. The sampling unit 210, the extracting unit 240, etc. as described with reference to FIG. 6 are omitted in FIG. 26.

The first degeneration compensating logic 301 may include a first accumulation unit ACC1, a first gain generating unit GCEN1, a boundary updating unit BBU and/or a first memory unit MEM11, etc. A second memory unit MEM12 may be included in the first degeneration compensating logic 301 and/or may be disposed outside the first degeneration compensating logic 301, but the example embodiments are not limited thereto.

The first accumulating unit ACC1 may store first accumulated block stress values BST1 corresponding to a plurality of first pixel blocks in the first memory unit MEM11 based on the input image data IDATA. As described above, all of the pixels in the display panel may be grouped into the plurality of first pixel blocks. The first gain generating unit GGEN1 may generate first compensation gains and/or first compensation factor values CG1 corresponding to the plurality of first pixel blocks based on the first accumulated block stress values BST1 extracted from the first memory unit MEM11. The boundary updating unit BBU may perform a boundary updating operation to update the block boundaries of the plurality of first pixel blocks as described with reference to FIGS. 1 through 24, etc.

The first memory unit MEM11 may be a volatile memory device such as static random access memory (SRAM) and/or dynamic random access memory (DRAM), etc., and the second memory unit MEM12 may be a nonvolatile memory device such as a flash memory, etc., but the example embodiments are not limited thereto. When the display controller 21 is powered off, the data such as the first accumulated block stress values BST1 stored in the first memory unit MEM11 may be moved into the second memory unit MEM12. The data stored in the second memory unit MEM12 may be loaded into the first memory unit MEM11 when the display controller 21 is powered on.

The second degeneration compensating logic 302 may include a second accumulation unit ACC2, a second gain generating unit GCEN2, a data correcting unit DCOR, an encoder ENC, a decoder DEC, a third memory unit MEM21 and/or a fourth memory unit MEM22, etc. A fifth memory unit MEM23 may be included in the second degeneration compensating logic 302 and/or may be external to and/or outside the second degeneration compensating logic 302, but the example embodiments are not limited thereto.

The second accumulating unit ACC2 may store second accumulated block stress values BST2 corresponding to a plurality of second pixel blocks in the fourth memory unit MEM22 based on the input image data IDATA. As described above, at least a portion of the pixels in the display panel may be grouped into the plurality of second pixel blocks, but the example embodiments are not limited thereto. The second gain generating unit GGEN2 may generate second compensation gains and/or second compensation factor values CG2 corresponding to the plurality of second pixel blocks based on the second accumulated block stress values BST2 extracted from the fourth memory unit MEM22.

The encoder ENC may compress the first compensation factor values CG1 provided by the first degeneration compensating logic 301 and store the compressed first compensation factor values in the third memory unit MEM21. The compensation factor values are changed slowly over time and thus the encoder ENC may adopt a compression scheme of high complexity to decrease an amount of data corresponding to the compensation factor values stored in the third memory unit MEM21. For example, the compression scheme of the encoder ENC may include image coding schemes of spatial compression such as discrete cosine transform (DCT), wavelet transform and fractal transform, entropy coding schemes of statistical compression such as Huffman coding and arithmetic coding, etc., but the example embodiments are not limited thereto. The decoder DEC may decompress the data read from the third memory unit MEM21 to provide the first compensation factor values CG1.

The data correcting unit DCOR may correct the input image data IDATA based on the first compensation factor values CG1 and the second compensation factor values CG2 to provide the corrected input image data CDATA. The corrected input image data CDATA are provided to a data driver and/or a source driver SDRV, and the source driver SDRV may drive and/or operate the pixels in the display panel 201 based on the corrected input image data CDATA.

In some example embodiments, as illustrated in FIG. 26, the display driving integrated circuit 101 may further include an image processing unit IMP configured to generate processed image data PDATA by processing the input image data IDATA to improve quality of displayed images, but the example embodiments are not limited thereto. In this case, the second degeneration compensating logic 302 may generate the second accumulated block stress values BAT2 by accumulating the processed image data PDATA, etc. The data correcting unit DCOR may correct the processed image data PDATA based on the first compensation factor values CG1 and the second compensation factor values CG2 to provide the corrected input image data CDATA.

The third memory unit MEM21 and the fourth memory unit MEM22 may be a volatile memory device, such as SRAM and/or DRAM, etc., and the fifth memory unit MEM23 may be a nonvolatile memory device, such as a flash memory, etc. When the display device 31 is powered off, the data such as the second accumulated block stress values BST2 stored in the fourth memory unit MEM22 may be moved into the fifth memory unit MEM23. The data stored in the fifth memory unit MEM23 may be loaded into the fourth memory unit MEM22 when the display device 31 is powered on.

In some example embodiments, the first degeneration compensating logic 301 may receive a panel image PIMG that is obtained using an image sensor SEN by capturing a test image displayed in the display panel 201. For example, the test image may be captured by applying the same value (e.g., a desired and/or maximum grayscale value) to all of the pixels in the display panel 201. The first degeneration compensating logic 301 may update the first compensation factor values CG1 based on the panel image PIMG and update the first accumulated block stress values BST1 based on the updated compensation factor values, but the example embodiments are not limited thereto.

The first degeneration compensating logic 301 may down-sample the first compensation factor values CG1 and provide the down-sampled compensation factor values to the second degeneration compensating logic 302. In addition, the display controller 21 may determine at least one region of interest (ROI) requiring higher compensation accuracy and/or where a higher compensation accuracy is desired, and provide the ROI information to the second degeneration compensating logic 302, etc. The second degeneration compensating logic 302 may apply coarse compensation to the entire region of the display panel 201 based on the down-sampled compensation factor values and then apply fine compensation to the ROI based on the ROI information and the second compensation factor values CG2, but the example embodiments are not limited thereto.

FIG. 27 is a diagram illustrating a region compensating operation in a display system according to some example embodiments.

Referring to FIGS. 26 and 27, the plurality of first pixel blocks as described above may correspond to an entire region EREG of a display panel DPN and the plurality of second pixel blocks as described above may correspond to at least one partial region REG1 of the display panel DPN, but the example embodiments are not limited thereto.

The first degeneration compensating logic 301 may generate the first compensation factor values CG1 with respect to the entire region EREG of the display panel DPN based on the first accumulated block stress values BST1 accumulated by the first accumulating unit ACC1 and may provide the first compensation factor values CG1 to the second degeneration compensating logic 302.

The second degeneration compensating logic 302 may correct the input image data IDATA corresponding to a rest region REG2, which does not include the partial region REG1 of the display panel DPN, based on the first compensation factor values CG1.

The second degeneration compensating logic 302 may generate the second compensation factor values CG2 with respect to the partial region REG1 of the display panel DPN based on the second accumulated block stress values BST2 accumulated by the second accumulating unit ACC2, and may correct the input image data IDATA corresponding to the partial region REG1 of the display panel DPN based on the second compensation factor values CG22.

The at least one partial region REG1 may have structural and/or operational characteristics different from the rest region REG2, but the example embodiments are not limited thereto. For example, the partial region REG1 may be a region under which an image sensor is disposed in an under display camera, a region in which a fingerprint input window is displayed, and so on. As such, the performance of degeneration compensation may be enhanced by independently managing the stress data for the partial region REG1, but the example embodiments are not limited thereto.

FIG. 28 is a diagram illustrating a data compensating operation in a display system according to some example embodiments.

Referring to FIGS. 26 and 28, the plurality of first pixel blocks PBa as described above may correspond to the entire region of the display panel DPN and also the plurality of second pixel blocks PBb as described above may correspond to the entire region of the display panel DPN, but the example embodiments are not limited thereto.

As illustrated in FIG. 28, a size of each of the plurality of second pixel blocks PBb may be greater than a size of each of the plurality of first pixel blocks PBa, but the example embodiments are not limited thereto. In this case, the first compensation factor values CG1 may have a relatively high resolution and the second compensation factor values CG2 may have a relatively low resolution in comparison to each other, but the example embodiments are not limited thereto.

As described above, the second degeneration compensating logic 302 may generate the second compensation factor values CG2 based on the processed image data PDATA that are similar to the real displayed image. In this case, the first compensation factor values CG1 may have a relatively low accuracy and the second compensation factor values CG2 may have a relatively high accuracy.

The first degeneration compensating logic 301 may generate the first compensation factor values CG1 with respect to the entire region of the display panel DPN based on the first accumulated block stress values BST1 accumulated by the first accumulating unit ACC1, and may provide the first compensation factor values CG1 to the second degeneration compensating logic 302.

The second degeneration compensating logic 302 may generate the second compensation factor values CG2 with respect to the entire region of the display panel DPN based on the second accumulated block stress values BST2 accumulated by the second accumulating unit ACC2, and may correct the input image data IDATA corresponding to the entire region REG1 of the display panel DPN based on the first compensation factor values CG1 and the second compensation factor values CG2, etc.

In some example embodiments, pixel values CCPX(x,y) of the corrected input image data CDATA may be obtained by applying a guided filter as shown in Expression 7.

$$CCPX(x,y)=Ak*CPX1(x,y)+Bk$$

$$\{Ak,Bk\}=\mathrm{MIN}\{\Sigma(CCPX(x,y)-CPX2(x,y))^2\} \quad \text{Expression 7}$$

In Expression 7, (x,y) indicates the positions of pixels, CPX1($x,y$) indicates first compensated pixel values by applying the first compensation factor values CG1 to the pixel values of the input image data IDATA, and CPX2($x,y$) indicates second compensated pixel values by applying the second compensation factor values CG2 to the pixel values of the input image data IDATA. The second compensated values CPX2($x,y$) may be used as an input image of the guided filter, and the first compensated values CPX1($x,y$) may be used as a n guidance image of the guided filter, etc. Ak and Bk indicate coefficients corresponding to a k-th window including the pixel at (x,y) and neighboring pixels, Σ indicates a sum with respect to the pixels in the k-th window, and MIN indicates a minimum function. As shown in Expression 7, Ak and Bk may be determined as values when a value of Σ(CCPX(x,y)−CPX2(x,y))2 according to least mean square (LMS) is decreased and/or minimized.

FIG. 29 is a diagram illustrating an accumulation period compensating operation in a display system according to some example embodiments.

Referring to FIGS. 26 and 29, the second degeneration compensating logic 302 may receive a mode signal MD from a display controller 21. For example, a first logic level (e.g., a logic low level) of the mode signal MD may indicate a normal operation OPR1 of the display controller 21 and a second logic level (e.g., a logic high level) of the mode signal MD may indicate a low-power operation OPR2 of the display controller 21, but the example embodiments are not limited thereto. The second degeneration compensating logic 302 may sample the stress data in response to the mode signal MD. In FIG. 29, t1~t11 indicate sampling time point of the stress data.

The first degeneration compensating logic 301 may generate the first accumulated block stress values BST1 by accumulating the input image data IDATA while the display controller 21 performs the normal operation, and the second degeneration compensating logic 302 may generate the second accumulated block stress values BST2 by accumulating the input image data IDATA and/or the processed image data PDATA while the display controller 21 performs a low-power operation.

During the low-power operation of the display controller 21 and/or the independent operation of the display driving integrated circuit 101, such as a command mode, an always on display (AOD) mode, a finger on display (FOD) mode, a low-frequency driving mode, etc., the second degeneration compensating logic 302 of the display driving integrated circuit 101 may accumulate the stress data instead of the first degeneration compensating logic 301 of the display controller 21, but the example embodiments are not limited thereto. The second degeneration compensating logic 302 may generate the second accumulated block stress values BST2 with respect to the at least one partial region of the display panel 201 and/or with the low resolution in comparison with the first accumulated block stress values BST1 generated by the first degeneration compensating logic 301.

The second degeneration compensating logic 302 may convert the first compensation factor values CG1 provided from the first degeneration compensating logic 301 to the first accumulated block stress values BST1, and may calculate final compensation factor values based on the first accumulated block stress values BST1 and the second accumulated block stress values BST2.

As described with reference to FIGS. 25 through 29, the accuracy and efficiency of the degeneration compensation may be enhanced through the respective management of the stress data by the display controller and the display driving integrated circuit.

Various example embodiments of the inventive concepts may be applied to any electronic devices and/or systems including a display device. For example, one or more example embodiments of the inventive concepts may be applied to systems such as a mobile phone, a smart phone, a personal digital assistant (PDA), a portable multimedia player (PMP), a digital camera, a camcorder, a personal computer (PC), a server computer, a workstation, a laptop computer, a digital TV, a set-top box, a portable game console, a navigation system, a wearable device, an internet of things (IoT) device, an internet of everything (IoE) device, an e-book, a virtual reality (VR) device, an augmented reality (AR) device, a vehicle navigation system, a video phone, a monitoring system, an auto focusing system, a tracking system, a motion detection system, etc.

The foregoing is illustrative of example embodiments of the inventive concepts and is not to be construed as limiting thereof. Although a few example embodiments have been described, those skilled in the art will readily appreciate that many modifications are possible to the example embodiments without materially departing from the inventive concepts.

What is claimed is:

1. A method of compensating for degeneration of an electroluminescent display device, comprising:

grouping a plurality of pixels in a display panel into a plurality of pixel blocks arranged in present block rows and present block columns based on initial block boundaries;

circulating accumulated block stress values based on a first input image data, each accumulated block stress value representing a degeneration degree of the pixels included in each pixel block of the plurality of pixel blocks;

performing a boundary updating operation on the plurality of pixel blocks, the performing the boundary updating operation including moving present block boundaries of the plurality of pixel blocks to updated block boundaries based on a distribution of the accumulated block stress values;

correcting the first input image data based on the accumulated block stress values and the updated block boundaries;

receiving a second input image data; and calculating new accumulated block stress values based on the second input image data and the updated block boundaries, each new accumulated block stress value representing the degeneration degree of the pixels included in the updated block boundaries of each pixel block of the plurality of pixel blocks.

2. The method of claim 1, wherein the performing the boundary updating operation includes:

updating the present block boundaries to the updated block boundaries based on a difference between degeneration degrees of adjacent pixel blocks of the plurality of pixel blocks.

3. The method of claim 1, wherein the performing the boundary updating operation includes:

updating the present block boundaries to the updated block boundaries by comparing a degeneration degree of each pixel block of the plurality of pixel blocks to a desired threshold.

4. The method of claim 1, further comprising:

repeating the boundary updating operation until the updated block boundaries approach burn-in boundaries, the burn-in boundaries indicated based on a degeneration pattern of the plurality of pixels.

5. The method of claim 1, wherein a moving amount of each block boundary by a single boundary updating operation is limited to be less than a desired moving amount.

6. The method of claim 5, wherein the desired moving amount is a pixel size.

7. The method of claim 1, further comprising:

storing the updated block boundaries in a nonvolatile memory device.

8. The method of claim 7, wherein the calculating the new accumulate block stress values includes:

calculating the new accumulated block stress values based on the updated block boundaries stored in the nonvolatile memory device in response to the boundary updating operation.

9. The method of claim 1, wherein the performing the boundary updating operation includes:

updating column block boundaries of the pixel blocks included in each present block rows based on a distribution of the accumulated block stress values of the pixel blocks included in each of the present block rows.

10. The method of claim 1, wherein the performing the boundary updating operation includes:

updating row block boundaries of the plurality of pixel blocks included in each of the present block columns based on a distribution of the accumulated block stress values of the pixel blocks included in each of the present block columns.

11. The method of claim 1, wherein the performing the boundary updating operation includes:

determining accumulated row stress values, the determining the accumulated row stress values including summing the accumulated block stress values of the pixel blocks included in each of the present block rows; and performing a row boundary updating operation based on a distribution of the accumulated row stress values, the performing the row boundary updating operation including moving present row boundaries of the present block rows to updated row boundaries defining the updated block rows.

12. The method of claim 11, wherein the performing the boundary updating operation further includes:

updating column block boundaries of the pixel blocks included in each of the updated block rows based on a distribution of the accumulated block stress values of the pixel blocks included in each of the updated block rows.

13. The method of claim 1, wherein the performing the boundary updating operation includes:

determining accumulated column stress values, the determining the accumulated column stress values including summing the accumulated block stress values of the pixel blocks included in each of the present block columns; and performing a column boundary updating operation based on a distribution of the accumulated column stress values, the performing the column boundary updating operation including moving present column boundaries of the present block columns to updated column boundaries defining updated the block columns.

14. The method of claim 13, wherein the performing the boundary updating operation further includes:

updating row block boundaries of the pixel blocks included in each of the updated block columns based on a distribution of the accumulated block stress values of the pixel blocks included in each of the updated block columns.

15. The method of claim 1, wherein the performing the boundary updating operation includes:

determining delta values indicating a difference between degeneration degrees of adjacent pixel blocks of each of the present block rows or each of the present block columns of the plurality of pixel blocks;

determining moving directions corresponding to the present block boundaries based on the delta values of each of the present block rows or each of the present block columns of the plurality of pixel blocks; and determining the updated block boundaries based on the moving directions.

16. The method of claim 15, wherein the determining the moving directions includes:

determining normalized delta values corresponding to a ratio of each delta value with respect to a sum of the delta values;

assigning edge values to the present block boundaries based on the normalized delta values;

determining a coordinate sequence by arranging present coordinates values of the present block boundaries based on the edge values; and determining the moving directions based on the present coordinate values and values of the coordinate sequence.

17. The method of claim 1, wherein the performing the boundary updating operation includes:

determining a low pass filter function based on an average of the accumulated block stress values of adjacent pixel blocks;

determining an accumulated distribution function based on values that are obtained by sequentially accumulating values of the determined low pass filter function;

determining moving directions corresponding to the present block boundaries based on values of the accumulated distribution function; and determining the updated block boundaries based on the moving directions.

18. The method of claim 17, wherein the determining the moving directions includes:

determining target coordinate values corresponding to values that are obtained by uniformly dividing the values of the accumulated distribution function; and determining the moving directions based on present coordinate values and the target coordinate values.

19. The method of claim 1, further comprising:

performing a second boundary updating operation on the plurality of pixel blocks, the performing the boundary updating operation including moving the updated block boundaries of the plurality of pixel blocks to second updated block boundaries based on the distribution of the accumulated block stress values; and correcting the second input image data based on the new accumulated block stress values and the second updated block boundaries.

* * * * *